(12) United States Patent
Bertram et al.

(10) Patent No.: US 8,544,689 B2
(45) Date of Patent: Oct. 1, 2013

(54) HAND HELD DISPENSER

(75) Inventors: George Bertram, Newton, CT (US); Douglas Walker, Hamden, CT (US); Matthew Hayduk, Glen Cove, NY (US)

(73) Assignee: Pregis Intellipack Corp., Tulsa, OK (US)

( * ) Notice: Subject to any disclaimer, the term of this patent is extended or adjusted under 35 U.S.C. 154(b) by 1539 days.

(21) Appl. No.: 10/591,769

(22) PCT Filed: Mar. 11, 2005

(86) PCT No.: PCT/US2005/008378
§ 371 (c)(1),
(2), (4) Date: Nov. 7, 2007

(87) PCT Pub. No.: WO2005/090037
PCT Pub. Date: Sep. 29, 2005

(65) Prior Publication Data
US 2008/0135579 A1 Jun. 12, 2008

Related U.S. Application Data

(60) Provisional application No. 60/552,207, filed on Mar. 12, 2004.

(51) Int. Cl.
*B67D 7/78* (2010.01)

(52) U.S. Cl.
USPC ............... 222/145.6; 222/146.5; 222/333; 222/504

(58) Field of Classification Search
USPC ............ 222/145.1, 145.5, 145.6, 333, 504, 222/529, 146.2, 146.5
See application file for complete search history.

(56) References Cited

U.S. PATENT DOCUMENTS

| | | | |
|---|---|---|---|
| 3,389,727 A * | 6/1968 | Feldpausch | 81/476 |
| 4,428,710 A | 1/1984 | Grisebach et al. | |
| 4,563,908 A | 1/1986 | Shube | |

(Continued)

FOREIGN PATENT DOCUMENTS

| | | |
|---|---|---|
| DE | 4141460 A1 | 6/1993 |
| DE | 10 2005 023 274 A1 | 11/2006 |

(Continued)

OTHER PUBLICATIONS

Notification Concerning Transmittal of International Preliminary Report on Patentability (Chapter I of the Patent Cooperation Treaty).

(Continued)

*Primary Examiner* — Kevin P Shaver
*Assistant Examiner* — Daniel R Shearer
(74) *Attorney, Agent, or Firm* — Smith, Gambrell and Russell, LLP

(57) ABSTRACT

A hand held dispenser system with associated dispensed material supply assembly as in separate source chemical foam precursor feeding into, for example, streamlined chemical passageways preferably each comprised of, in series, a castellated swivel hose filter, a valve assembly housing, a wing extensions of a manifold, which manifold supports a high efficiency drive system and is supported by a handle that provides for a compact assembly and receives a rugged trigger assembly. The manifold design provides for elongated filter and, temperature controlled cartridge heater insertion. There is further provided in a preferred embodiment a readily releasable electric source feed line plug connection at the butt end of the dispenser. The dispenser is well suited for the dispensing of methane foam as in a product packaging setting.

41 Claims, 38 Drawing Sheets

(56) References Cited

U.S. PATENT DOCUMENTS

| | | | |
|---|---|---|---|
| 4,674,268 A | 6/1987 | Gavronsky | |
| 4,718,291 A | 1/1988 | Wood et al. | |
| 4,747,212 A | 5/1988 | Cavdek | |
| 4,800,708 A | 1/1989 | Sperry | |
| 4,854,109 A | 8/1989 | Pinarer | |
| 5,215,226 A * | 6/1993 | Bertram et al. | 222/135 |
| 5,246,143 A * | 9/1993 | Cherfane | 222/145.2 |
| 5,265,761 A * | 11/1993 | Brown | 222/1 |
| 5,375,743 A * | 12/1994 | Soudan | 222/145.5 |
| 5,529,245 A | 6/1996 | Brown | |
| 5,709,317 A * | 1/1998 | Bertram et al. | 222/135 |
| 5,996,848 A | 12/1999 | Sperry et al. | |
| 6,283,329 B1 | 9/2001 | Bezaire et al. | |
| 6,393,930 B1 | 5/2002 | Song et al. | |
| 6,484,456 B1 | 11/2002 | Featherstone et al. | |
| 6,793,098 B2 * | 9/2004 | Huber et al. | 222/1 |
| 7,213,383 B2 | 5/2007 | Walker | |
| 7,490,737 B2 | 2/2009 | Cocciadiferro | |
| 7,552,847 B2 | 6/2009 | Hayduk | |
| 7,735,685 B2 | 6/2010 | Bertram | |

FOREIGN PATENT DOCUMENTS

| | | |
|---|---|---|
| GB | 613211 | 11/1948 |
| GB | 726152 A | 3/1955 |
| GB | 1094350 | 12/1967 |
| WO | 2004/101245 A2 | 11/2004 |

OTHER PUBLICATIONS

International Preliminary Report on Patentability.
Written Opinion of the International Searching Authority.
Notification Concerning Transmittal of International Preliminary Report on Patentability (Chapter I) in PCT/US2005/008378, dated Sep. 21, 2006.
International Preliminary Report on Patentability in PCT/US2005/008378, dated Sep. 21, 2006.
Written Opinion of the International Searching Authority in PCT/US2005/008378, dated Sep. 21, 2006.

* cited by examiner

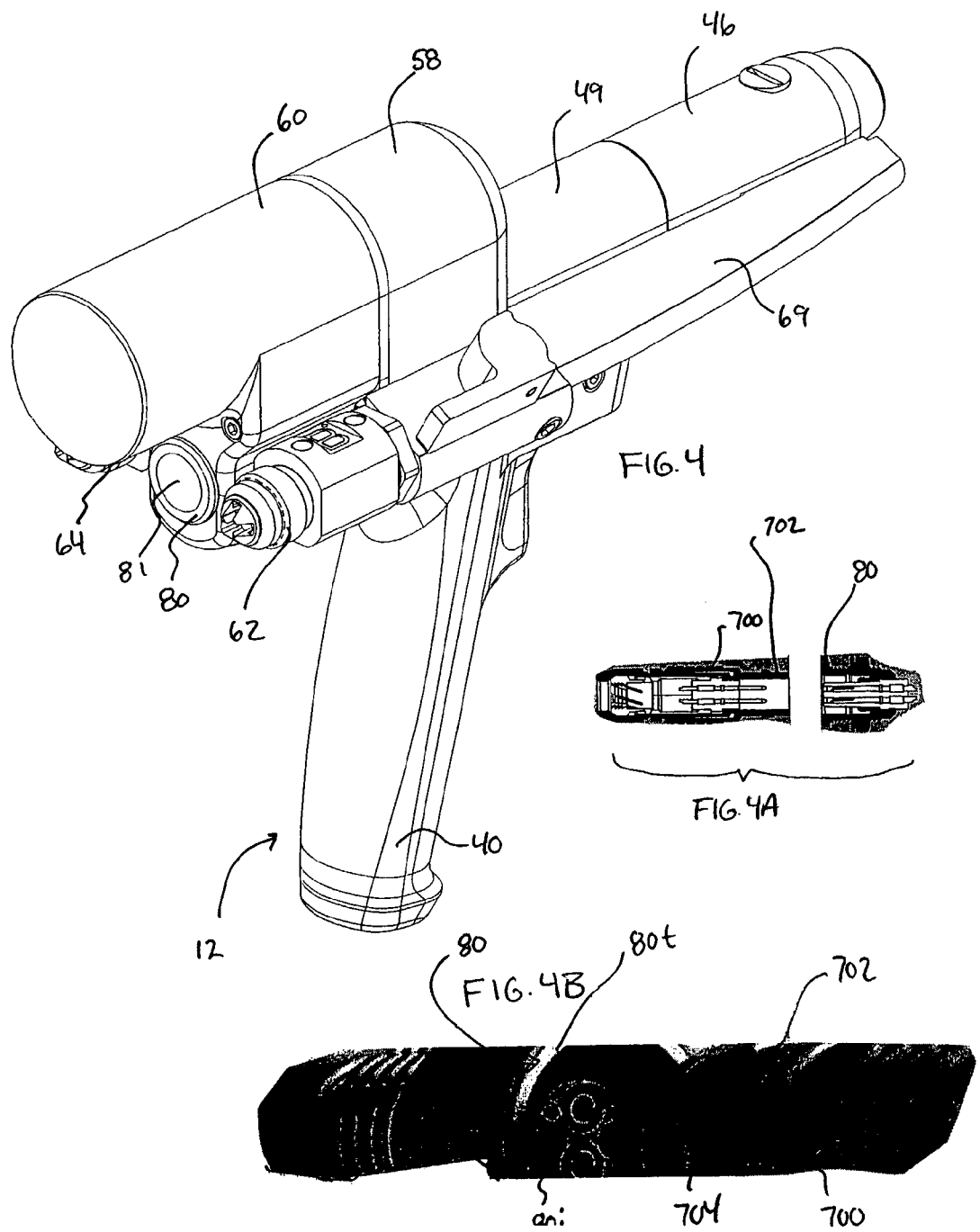

HAND HELD DISPENSER

CROSS REFERENCE TO RELATED APPLICATIONS

The present application claims priority to U.S. Provisional Patent Application No. 60/552,207, filed Mar. 12, 2004 which is incorporated herein by reference in its entirety.

BACKGROUND

A variety of material dispensers have been developed including those directed at dispensing foamable material such as polyurethane foam which involves mixing certain chemicals together to form a polymeric product while at the same time generating gases such as carbon dioxide and water vapor. If those chemicals are selected so that they harden following the generation of the carbon dioxide and water vapor, they can be used to form "hardened" (e.g., a cushionable quality in a proper fully expanded state) polymer foams in which the mechanical foaming action is caused by the gaseous carbon dioxide and water vapor leaving the mixture. In particular techniques, synthetic foams such as polyurethane foam are formed from liquid organic resins and polyisocyanates in a mixing chamber (e.g., a liquid form of isocyanate, which is often referenced in the industry as chemical "A", and a multi-component liquid blend called polyurethane resin, which is often referenced in the industry as chemical "B"). The mixture can be dispensed into a receptacle, such as a package, a mold, a product recess or a foam-in-place bag (see e.g., U.S. Pat. Nos. 4,674,268, 4,800,708 and 4,854,109), where it reacts to form a polyurethane foam.

With respect to dispensers using urethane-foam for packaging applications, the first practical hand-held dispensers are believed to have become commercially available in the late 1960's. These designs were considered an advancement compared to the massive, complicated, and messy urethane dispensing machinery available prior to that time. Initially, almost all components of a dispenser were built into a single housing, which was relatively bulky. This large housing incorporated a pneumatic drive cylinder, a mixing chamber with ports, a valving rod, and a solvent chamber—only the handle (with trigger) was a separate item. The single housing dispenser was easy to service or change, but it was an expensive item, as the entire drive mechanism had to be returned for service every time a mixing chamber wore out, or an operator was not able to clean a clogged chemical port.

Because of the high cost of these dispensers, return programs were set up, so that customers could return the used dispenser units to the factory for credit and refurbishment. This quickly became a logistical, and a cost accounting nightmare.

A subsequent technology modification was the introduction of the cartridge gun. The cartridge was a separable item from the drive cylinder, and it incorporated the items that were most prone to failure—the chemical ports and mixing chamber. This meant that there was a lot less to discard when a failure occurred. The cartridges were very inexpensive compared to the old style gun units, and were intended to be throwaway item. This eliminated the above noted logistical and accounting nightmare, but the customer still had to purchase cartridges whenever they became inoperable, and thus was still a source of expense. The typical cartridge oriented dispenser design during this time frame was pneumatically driven, and required that the customer have a clean and dry supply of compressed air with a line pressure typically between 80 and 120 psi. Air driven dispensers have some advantages as in being simple, easy to understand design, easy to maintain, and inexpensive to manufacture. Air driven dispenser also have some limitations, however, such as:

a) Limited to locations that provide compressed air to power them—this would often require the operator to invest in, and install a shop air compressor.

b) Shop air driven power is very inefficient, some estimates put the efficiency factor at 10%. Consequently, it is very expensive to run air-powered equipment.

c) These dispensers did not operate properly if shop air pressure was too low—they will be unable to generate enough force to open the cartridge.

d) Even with adequate air pressure, pneumatic guns have a relatively low opening force, compared to electric drive dispensers that were developed in later years.

e) Cartridges, as they are used, develop a build-up of urethane on the inside diameter ("ID") of the mixing chamber, which gradually increases the level of force required to open the cartridge. Consequently, the relatively low opening force limits the service life of the cartridge, since it is useless if it can no longer be opened by the drive system.

f) Air driven dispensers are sensitive to water in the air supply lines—which can wash the lubrication out of the sliding seals—and leak into the A chemical container from the pumps, and also are sensitive to oil and rust in the compressed air supply lines.

g) These prior art pneumatic dispensers are also not robust in the workplace, and required frequent maintenance and repair.

In most settings, the problems associated with these air driven systems were deemed by the operators to outweigh the advantages. Accordingly, "All electric" systems appeared in the field, and, were deemed an improvement by some over the air driven systems such that many a typical hand-held dispenser today is a cartridge based, all-electric mechanism. In some conventional hand held dispensers, there is utilized an electric motor driven ball screw which opens and closes the valving rod in the mixing module to turn the flow of foam on and off, and these typical conventional hand-held dispenser mechanisms have the following components:

Drive Motor—DC Brush Type—24 to 36 volts—rare earth magnets for highest power in the smallest package;

Ball Screw—translates the rotary motion of the motor into linear motion that moves the valving rod;

Gear Train—connects the motor shaft to the shaft of the ball screw;

Handle—for user to hold while dispensing foam—contains the trigger switch and trigger boot;

Manifold—mounted to the handle, the manifold typically provides the mechanical backbone of the dispenser—supporting the drive system and the mixing module, and connecting to the chemical hoses that come from the pumps;

Mixing Module—The component that mixes the two foam precursor chemicals A and B together to initiate the foaming process;

Manifold Heater—attempts to keep the manifold temperature close to the chemical's operating temperature to minimize the cold-shot effect—where the two chemicals do not mix well at the start of a shot because they have sat in an unheated manifold for an extended period;

Trigger Switch and Boot—mounted inside the handle, the trigger starts and stops the dispensation of foam—the boot is a flexible cover designed to protect the trigger and to provide comfort for the user's finger;

Small Filter Screens—mounted in the flow paths of the manifold, these removable wire mesh screens protect the orifice ports in the mixing module from particulates in the chemical;

Cable Strain Relief—for the umbilical cable that connects the dispenser to the control console (intended to prevent damage from pulling, twisting, or bending of the cable during routine use) mounted on the rear of the handle.

The electric driven hand held dispensers thus have some advantages over the air driven systems in avoiding some of the above noted problems associated with air driven systems, but the electric driven systems (as well as many other current hand held dispenser designs in general) also suffer from a variety of drawbacks. For example, the placement and/or sizing of components of many of the prior art designs as in the shutoff valves, swivel fittings, port plug and filter screens provide for a bulky, non-slender handheld design with associated drawbacks as in poor operator ergo-dynamics (e.g., poor balancing in hand), poor visibility and container accessing limitations, as well as high susceptibility to chemical contamination of dispensed product build-up on those components. Additionally, many of the prior art designs involve small area filter elements and typical electric driven hand held dispensers are prone to failure as in freewheeling failures and gear failures, lack of sufficient power to avoid freeze ups despite having driving systems that often present bulky and excessive component drive transmissions. Additional drawbacks associated with typical conventional designs include non-robust trigger switches, poor electrical power line dispenser connections, poor chemical heater performance (when provided at all) in the hand held dispenser, low volume solvent feeding systems and inefficient mixing module mounting systems.

SUMMARY OF THE PRESENT INVENTION

The subject matter of the present invention is directed at providing a hand held dispenser that seeks to avoid one or more of the above noted prior art drawbacks, with a preferred embodiment seeking to avoid the degrading effects of the above noted problems in combination. The following discussion is illustrative of some of the improvements presented in the inventive subject matter of the present application.

The inventive subject matter includes in one embodiment a dispenser system with a hand held dispenser with associated dispensed material supply assembly as in separate source chemical foam precursor feeding devices for feeding chemical precursor to a mixing chamber of the hand held dispenser. While the discussion below is in reference to a dual foam precursor chemical supply system, the various features of the invention find usefulness in other hand held dispensing systems (including single dispenser material supply systems and separate source, mixed material dispensing systems) and thus the inventive subject matter is non intended to be limited to the preferred embodiments described herein.

A preferred embodiment of the hand held dispenser of the present invention features a long, slender manifold with a narrow face. A narrower configuration is made available through revisions made to slenderize the manifold. For example, under an embodiment of the present invention, the chemical feed shutoff valves are moved to the back of the dispenser (in the rearward ⅓ of ¼ of the total length of the dispenser) as, in previous conventional hand-held dispenser designs, these components were placed near the front face of the manifold. In this preferred embodiment, the swivel fittings and hose connections are similarly moved farther back in comparison to previous hand-held dispenser designs (the back ⅓ or ¼ length region of the dispenser).

In a preferred embodiment of the invention the clean-out port diameter on the face of the manifold is dramatically reduced in comparison to what has been done in prior art hand-held dispensers (e.g., dispenser "900 series" hand held dispenser of Sealed Air Corporation located in Saddle Brook, N.J., USA, described above). Also, the mechanism that holds the mixing module in place on the manifold is simplified to make is quite smaller and is placed out of the way on the underside of the mixing module support, thereby minimizing its size and mass and providing contamination protection. Furthermore, placement of the shutoff valves, swivel fittings, and hose connections to the rear of the dispenser also provides for a minimized size in the mechanism involved in holding the mixing module in place on the manifold.

In a preferred embodiment, each of the above slenderization features are used in combination, although the inventive subject mater of the present invention includes these slenderization features individually and in the various possible sub-combinations. The slenderization of the manifold and dispenser gun helps, in general, in allowing the dispenser nose to fit into smaller openings when shooting a foam-in-place pack or a molded cushion, can improve foam distribution and pack quality, makes for more efficient use of foam, and can result in a cleaner operation as one can better place the foam where it needs to be. In addition, a preferred arrangement of the present invention also provides for placement of sensitive components away from a potential source of contamination. For example, by moving the valves, swivel fittings, and hose connections away from the mixing module area, the amount of chemical contamination to which these components are exposed is reduced. Chemical A, chemical B, holster solvent, port cleaner spray, and foam contamination will tend to make moving parts sticky, and harder to operate, and thus the movement of sensitive dispenser components away from these potential contaminant sources helps avoid gun bind up. The avoidance of contaminant build up on sensitive or susceptible components avoids having components like the swivel fittings and the shutoff valves not rotate as freely which can occur if their mating surfaces are contaminated. The process of changing a mixing module can be a major source of contamination as solvents are used to flush the ports of the manifold clean, and thus the avoidance of such a contamination setting is beneficial. Furthermore, the dispensation of foam is another potential source of contamination due to the splattering that occurs during operation.

An arrangement under a preferred embodiment as the present invention features large area filter screening. For example, by moving the valves to the back of the manifold, and elongating the manifold, there is provided a much larger space for a filter element. The screen is preferably positioned downstream of the shutoff valve; otherwise, there can be experienced difficulty in accessing it for cleaning without opening fittings that are upstream of the valve and that could be very messy. Preferably the access opening are in the forward most end wall(s) of the dispenser (e.g., the front end of the mixing module support structure) and extend for more than half of the total length of that support structure extending along the top of the handle. Previous designs had relatively small filter elements because the space between the valve and the clean-out port on the face of the manifold was small. A preferred embodiment of the present invention provides a spacing that allows for a filter that is about 10 times larger in surface area than previous hand held dispenser filter elements of similar volume output capacity. The inclusion of the enlarged filtering area arrangement of the present invention thus provides an additional advantageous feature in a preferred embodiment which is preferably used with the above noted slenderization and contaminate avoidance features while not degrading to any appreciable extent the slenderization quality, although the present invention includes embodiments free of the additional enlarged filter area feature. The advantageous combination of an enlarged filtering area and a narrowed or slenderized dispensing gun is featured, however, in a preferred embodiment of the present invention.

The slenderization modifications also provide for enhanced ergonomic balancing in the hand of the operator. For example, by moving most of the above noted heavy components rearward, the balance of the dispenser in the user's hand is improved, as a shift in the center of gravity makes moving and handling the dispenser less stressful to the wrists and hand muscles after potentially multiple hours of usage. Even a small difference in hand balance and ease of manipulation can make a noticeable difference to an operator.

The present invention also preferably features an enhanced drive transmission system (also being considered illustrative of inventive subject matter under the present invention both alone and in any combination relative to the above and below described features) with a preferred embodiment featuring a ball screw drive design having a ball screw assembly that is designed with a pitch angle of less than 11° and preferably less than 6°, as in 5.5°, as compared to previous ball screw designs that were made with a pitch angle of 11°. Preferably, under the present invention a pitch angle of about 9° or less (e.g., 9±0.5°) is utilized. It is considered that a ball screw arrangement having a pitch angle exceeding about 9° and more so at or above 11° is more susceptible to a failure mode called "free-wheeling", where the screw turns, but the nut does not advance on the screw. Thus, a larger angle arrangement slips instead of advancing, much like an automobile trying to climb an icy hill. If the slope or angle of the hill becomes too steep, the car spins its wheels and goes nowhere. Prior art ball screw designs, used for urethane dispensing applications, because of their configuration and placement on the dispenser featured presented an 11° pitch angle which is prone to the freewheeling failure mode described above, and represents one of the leading causes of downtime for these prior art guns.

A preferred ball screw design of the presents invention addresses this problem with a reduction in pitch angle (including pitch angles of about 6° or less, as in a 5.5° pitch angle, which is below the noted 9° and even further below the prior art 11°). A preferred embodiment of the present invention also preferably features an upstream to ball screw gear transmission system that uses only two gears instead of four, as was the case in previous hand-held dispenser designs that relied on four gears in their upstream drive transmission of the means for reciprocating the valve and/or purge rod due to, for example, poor relative placement of the motor and the valve or purge rod reciprocated by the motor.

This reduction in the number of gears is facilitated by moving the motor to the rear of the dispenser and closer to the centerline of the ball screw without interference. A review of previous designs shows a positioning of the motor either well above or below the ball screw (e.g., above the ball screw), so the spacing between the centerline of the motor and the centerline of the ball screw could not be any closer. This minimum spacing required in some prior art guns four gears to make up the gap, as it could not practically be done under those systems with only two. In a preferred embodiment of the present invention, the motor is moved much closer (e.g., the motors central shaft axis being distanced 3 cm or less and preferably within 1 or 2 cm) to the centerline of the ball screw, since the motor preferably extends from or hangs off the back of the gun. Thus, there is avoided motor interference with the ball screw, and the motor can be installed in line with the ball screw. The gear train under a preferred embodiment of the present invention provides a gear ratio, to amplify the torque of the motor. Typically, a gear ratio of at or below 2.5:1, as in 2:1 or 2.3:1 is representative.

A preferred embodiment of the present invention also preferably features a gear system that uses hardened steel gears that avoid service, except in the most extreme cases of abuse or vandalism. That is in contrast to the possible, but less preferred, previous gear designs using aluminum, soft stainless steel, or plastic gears, which, relative to prior art systems, presented frequent service problems in the field as they tended to have a very short service life in comparison to hardened steel. To even further avoid servicing requirements, the present inventions gears can also be made thicker by about 50% as in 0.250±0.05 inches. The drive transmission system is preferably used in conjunction with the aforementioned inventive features as in the filtering, slenderization contamination avoidance and motor placement, although the subject matter of the present invention also includes the inventive features previously described herein alone or in the various possible sub-combinations.

An additional preferred embodiment of the present invention also features a robust trigger design as trigger switch failures represent frequent failure modes on previous dispenser designs (the robust trigger design also being considered illustrative of inventive subject matter under the present invention both alone and in any combination relative to the above or below described features). An embodiment of the present invention features a trigger assembly designed to be sturdier than prior art designs, and which includes a miniaturized mechanical switch, having a preferred 2,000,000-cycle mechanical life rating. This switch, although very reliable if treated with respect, is fragile—so a preferred embodiment of the present invention is further designed with a rugged casing (e.g., a two piece aluminum casing) to surround it and protect the switch from almost any conceivable impact. This ruggedness enhancement means feature is also preferably supplemented by isolating the tiny trigger button on the microswitch by building a plunger (of, e.g., brass) into the casing that is controlled in its movement (e.g., providing an axial slide stop on the plunger). The plunger activates the trigger button on the switch when depressed by the trigger boot, which is deformed by the user's trigger finger. However, severe impacts to the plunger will not be transmitted to the microswitch, essentially isolating the switch from the outside environment.

Prior trigger designs are often based on purchasable switch assemblies that have everything in one package, with the housing of these made of plastic. These are fine for many intended applications, but considered not rugged enough to survive in rough handling environments often associated with a handle held dispenser as in urethane dispensers. For example, in the urethane dispenser field, trigger switches suffer from a multitude of failure modes as in impact related failures and chemical attack by, for example, the mixing module chemical port cleaner solvent.

An embodiment of the invention also features a clean-out port on the side of the manifold. For example, an embodiment of the invention features a dispenser manifold that has two extra cleanout ports, one for each chemical passageway that are plugged with a removable plug (e.g., allen head threaded plug). These cleanout ports are preferably located just downstream (e.g., within 1 to 2 cm) of each shutoff valve, and aid in the flushing and cleaning of chemical passageways, as in the passageways that run from the dispensed chemical flow shut off valve to the mixing module. They are thus positioned in the rear area of the manifold chemical passageway and can be utilized in conjunction with access ports made available upon removal of the filter inserts.

An additional preferred embodiment of the present invention features a temperature control means as in, for example, a temperature control associated with a manifold cartridge heater, as in one built into the manifold. For example, a cartridge heater that delivers 150 Watts of power at, for instance, 28 volts, DC, input power, is suitable for heating a preferred manifold embodiment to near operating temperature in about two minutes. Previous manifold designs either had no heater or used low powered PTC type heaters. PTC stands for Positive Temperature Coefficient—and refers to a class of thermistor that has a positive temperature coefficient, which means that its resistance increases as its temperature increases. PTC's are often used as heaters because they self-limit the current flow as their resistance increases. These PTC type heaters are designed to generate 10 to 15 watts of power, and have difficulty bringing the manifold up to operating temperature (130 to 140 deg F) because they lack sufficient power to do so. PTC based manifold/heater combinations also typically require 20 or 30 minutes to achieve a steady-state temperature which, in many system, is considered too long a time, because the rest of the system heats up in five minutes or less. The steady state temperature for such prior art systems will usually be between 100 deg F and 115 deg F, which is not hot enough to eliminate a cold shot in many settings. The PTC heater is just allowed to run until it gets hot enough to power itself down for safety.

A preferred embodiment of the dispenser under the present invention has a closed-loop temperature control system for the manifold and its heater. An NTC type of thermistor is mounted, for example, directly into the dispenser manifold, and can measure temperature with an accuracy of plus or minus 2 degrees Fahrenheit. NTC stands for Negative Temperature Coefficient—and refers to a class of thermistor that has a negative temperature coefficient—which means that its resistance decreases as its temperature increases. NTC's are mainly used to measure temperature—they are not considered heaters. Accordingly, the thermistor of a preferred embodiment of the present invention is used for measuring temperature, not for generating heat.

Also, previous manifold heaters were open loop, and these designs did not utilize a temperature sensor for feedback. Consequently, the manifold temperature was not controlled, and wide variations are typically observed, indeed, they are expected, depending on ambient conditions and many other factors. A variation from a pre-set preferred chemical temperature at the mixing module can result in poor or degraded foam quality.

An additional embodiment of the present invention features a connector (e.g., electrical receptacle) on the rear of the dispensing handle. For example, in one embodiment of the invention the dispenser features nine separate wires to operate all of its electrical components, and all nine of these conductors are preferably built into one jacketed cable, which is the dispenser's umbilical cable. For example, it connects the dispenser, electrically, to the base unit of the dispenser running the full distance back to the base unit without any in-line connections along the way. By providing a receptacle on the back of the handle under a preferred embodiment, the receptacle mates with a plug on the dispenser end of the umbilical cable.

This plug in relationship is advantageous relative to the prior art, as in the aforementioned Sealed Air's 800 and 900 series dispensers. For example, previous electric dispenser designs used a pigtail style of connection. In the pigtail style, there is no electrical receptacle (e.g., a removable, friction based plug in connection) mounted to the rear of the dispenser in the pigtail style of design. Instead, there is a plastic strain relief, mounted to the rear of the dispenser handle (in generally the same relative location as the preferred friction based plug-in based connector of the present invention's dispenser handle design).

The aforementioned strain relief is tightened securely to a length of multi-conductor cable. For instance, in the 800 series equipment noted above the length of cable extending from the strain relief is about 3 feet. This is called the pigtail in the art. The prior art Sealed Air's 900 series equipment described above, the length of this pigtail cable is over 20 feet, as it runs all the way back to the wall mounted control console, while in the 800 series, the pigtail terminates with an inline electrical connector, which plugs into a mating connector on the end of the long cable that completes the run back to the wall-mounted console. This in line connection is located about three feet back from the dispenser, and creates some problems in the field by being there. Also, the aforementioned prior art electrical connection is bulky and located right where the operator will likely place his hands or his shoulder when dispensing foam. Moreover, it is not easy to secure the connector to the hose, and it tends to hang off to the side and away from the hose assembly. As a result, the threaded connections that hold the mating halves of the connectors together will loosen, causing all sorts of intermittent electrical problems that are difficult to troubleshoot. Sometimes, service reps or plant maintenance personnel will tightly tie-wrap the inline connector to the chemical hoses to prevent it from dangling in the way of the worker. However, this can easily over-restrain the connector assembly to the hoses, which are quite flexible and bend easily. This tight tie-in can sometimes overstress the connector, causing it to break, or become intermittent.

With regard to the very long pigtail cable, that connects the Sealed Air 900 series dispenser back to the wall-mount console, because of its long length, it is not so easy to remove the dispenser from the system for quick service. In addition, it is not easy to install a replacement dispenser because the full length (over 20 feet) of cable has to be managed all the way back to the console. If an operator needs to quickly replace a non-working dispenser with a new unit, or at least another functional unit, for a quick service turnaround time, this task is complicated by the sheer length of the cable. Even the new, replacement dispenser, will have to be shipped with the full length of cable. In a high production environment, it is often prudent to simply replace the non-functional dispenser, rather than attempt to repair it on the machine. This is done to minimize downtime, to get the customer's packaging line up and running as quickly as possible. Often, the cost of downtime will far exceed the value of the dispenser. Once removed, the faulty unit can be fixed off-line at a more convenient time.

A preferred embodiment of the present invention has an arrangement that allows for easy and fast dispenser changeover. For instance, since the cable is not part of the dispenser, it readily disconnects right from the back of the handle (e.g., a solid plug arrangement (as in a cylindrical multiprong plug arrangement or a reverse female receptacle with handle male plug member arrangement) providing sufficient friction of contact to preclude regular use separation while allowing for quick release at a desired time for change over of a dispenser.

With this umbilical cable connection, there is also avoided the need for an inline connector on a pigtail. Inline connectors are prone to failure or accidental disconnection, and can get in the way of the operator. In addition, the above described approach of the present invention makes for a cleaner looking system as there is avoided dangling connectors and extra tie-wraps.

An additional preferred embodiment feature includes a smooth front surface of the manifold. For example, the migration of the large, and sensitive components (i.e., shutoff valves, swivel fittings, hose connections, etc.) to the rear of the preferred dispenser design allows the front portions of the manifold, those areas that are most likely to be contaminated by foam and solvent residue, to be made smoother, with fewer nooks and crannies. These cleaner lines will help to minimize the effort required to clean-up those areas. (The mixed foam precursors have an adhesive quality making the material difficult to remove, particularly when found in nooks and crannies. Additional background discussions as to the adhesiveness of the foam and contamination of surface components can be found, for example, in PCT Publication No. PCT/US2004/014423 filed May 7, 2004 claiming priority off of application Ser. No. 10/623,100 filed Jul. 22, 2003 which are incorporated by reference in their entirety). Additional contouring is also provided in the dispenser design for non-functional ornamental reasons as well.

An additional embodiment or arrangement of the invention includes one having a mixing module mounting assembly and method of mounting the mixing module to the dispenser manifold, which provides for effective and yet easily serviceable securement. In one embodiment of the mixing module mount means of the present invention, there is provided two robust fasteners such as socket head cap screws to simply hold the module in place. Some benefits of this approach include:

a) The mixing module is subject to a very secure mounting method—both screws are unlikely to fail—and in an alternate embodiment a single screw down arrangement is featured (or greater than two although two is deemed well suited for usage in the field);

b) The screw method is very inexpensive to manufacture;

c) The screw method is very simple—easy to understand—easy for most users to service when required; and d) It is also a very robust design, unlikely to fail and the mixing module (which is preferably made of aluminum, has the female threads, and is the component most likely to show wear and fatigue) is the component that gets replaced.

A preferred mixing module design further includes solvent chamber inside the module housing that has a high volume solvent (e.g., greater than 0.250 in$^3$, more preferably greater than 0.400 in$^3$ as in 0.474 in$^3$, with the latter value being considered more than four times greater in volume than comparative prior art designs). As with the other advantageous features described above and below, this feature is deemed inventive subject both alone and in combination with anyone of the additional features described herein.

An additional feature of a preferred embodiment is making the end of the valving rod that fits into a robust capture end of the puller mechanism of the ball screw which is considered a much more robust arrangement than prior designs for hand-held systems. The valving rod end on, for example, the prior art cartridge designs described herein is fragile and prone to failure. In this regard, reference is made to PCT Publication No. PCT/US2004/014420 filed May 7, 2004 which claims priority off of Ser. No. 10/623,716 filed Jul. 22, 2003 which discusses this problem in the prior art and which is incorporated by reference.

An additional preferred feature is a mixing module cap made from hardened steel at the face of the module. That is, the face of a preferred embodiment of a hand-held mixing module is made from a material that is hard, and abrasion resistant as in the hardened steel (Rc 58) is resistant to scratching, wear, and abrasion caused by, for example, stainless steel bristles of the brush in the solvent holster (a holder that is either user supported or attached to a nearby station holder). The solvent brush bristles in such holders are often made from stainless steel, which is significantly softer than the hard steel of the cap. Consequently, the bristles will not damage the face of the mixing module (i.e., the cap has a greater hardness than bristle brush steel).

A preferred embodiment also features a hood cover or cowling feature on the rear end of the mixing module which protects sensitive areas from chemical, foam, and solvent contamination. For example, The area behind the mixing module is exposed to foam spatter, A-chemical, B-chemical, holster solvent, and port cleaner solvent. These contaminants, through various mechanisms, cause service problems with the dispenser mechanism. A ball screw drive is particularly sensitive to contamination—and the area behind the mixing module is a potential pathway for this contamination to enter into the ball screw. In addition, the valving rod puller at the end of the ball screw can become clogged with these chemicals, making it difficult to remove or install the mixing module. The integrated hood provides means for protecting this sensitive area from contamination, in an efficient and easy to install manner.

An additional feature of a preferred embodiment of the present invention is ease in disassembling for service based on, for example, one or more of the following attributes:

a) Removable Handle (e.g., four screws only)

b) Removable Motor Cover (e.g., two screws only)

c) Removable Front Cover (e.g., two screws only)

d) The Drive Train Separates from the Chemical Manifold (e.g., four screws only) so there is no need to break into any chemical lines to replace a malfunctioning drive unit.

The ease in disassembly (and correspondingly assemble) of the noted components minimizes downtime in what can offer to be a critical operational situation.

A still further feature of a preferred embodiment of the present invention is the providing of chemical line swivel fittings which are less prone to chemical leakage than previous designs. For example, the prior art single bearing design approach, used in the 900 series swivel, is considered to be insufficient in bearing support. That is, the single bearing design is considered not well suited to prevent, large or even slight wobbles between the inner and outer swivel housings. This wobble can work the o-ring seals, deforming them in a manner that they were not intended to withstand, causing them to leak slightly. This lack of rigidity in the previously used swivels led to increased leakage and premature seal failure. An embodiment of the present invention features a double ball bearing arrangement (pair of axially spaced caged ball bearing sets), instead of only one, between the inner and outer ends of the swivel housings. This helps eliminate wobble, and greatly improves the life of the seals. In addition, the swivel of the preferred embodiment employs a double o-ring seal. Previous designs like those described above are deemed to have relied on only one. Also, a preferred design is able to incorporate the double seals, and the double bearings, in a package only slightly bigger than prior art designs, that have only single bearings and single seals.

A preferred embodiment of the present invention also features an arrangement which prevents the tip of the heater wire (e.g., a resistance coil that runs in the chemical supply hose extending between the base unit and the dispenser) from blocking the flow of chemical through the swivel fitting. For example, chemical hose internal heater wires on hand-held systems generally extend all the way to the dispenser end of the chemical hose. That is, the heater wire on many hand-held systems extends as closely as possible to the dispenser, in order to minimize the cold shot caused by unheated sections of chemical hose. If the heater wire does not extend to the dispenser, there will be a section of unheated hose, and the chemical in that unheated section will be cooler than the heated section of the hose. Because of this, the tip of the heater wire has the potential to block chemical flow by means of its tip end getting lodged into whatever fitting that the tip extends into. The main function of the heater wire tip is to ease the passage of the heater wire through the inside diameter of the chemical hose, which is often not smooth, but convoluted. The convolutions greatly improve the flexibility and kink-resistance of the chemical hose, but tend to present sharp edges or protrusions that catch on anything slid through the hose's inside diameter.

In many cases, a Teflon insert is provided with a bullet nose shape extending forward, on the leading edge of the heater wire assembly (reference being made for the previously incorporated PCT applications for further background). This Teflon insert helps the tip of the heater wire to slide over the convolutions. However, if the heater wire is longer than the chemical hose, this tip will lodge itself in the fittings that the hose is connected to, on the dispenser end. Since the fitting's inside diameter and the Teflon tip's outside diameter are about the same, the tip can easily block the flow of chemical to the mixing module, causing a system shutdown.

The problem is addressed in a preferred embodiment of the present invention by designing the input end of the swivel fitting with castellation design. The swivel fitting with inflow and castellation device preferably includes a tapered body with circumferentially spaced projection(s) with adjacent opening(s) which provides for continued flow despite potential abutment of the plug insert at the tip of the heater wire relative to the swivel fitting. This prevents the tip of the heater wire from blocking flow; even if it is pressed in as far as it can go.

BRIEF DESCRIPTION OF THE DRAWINGS

Many aspects of preferred embodiments of the present invention can be better appreciated with reference to the following drawings:

FIG. 4 shows a rear perspective view of the hand held dispenser of FIG. 2.

FIG. 4A shows a cross-sectional view of the male/female electrical line connector members.

FIG. 4B shows in cut-away greater detail the connector members.

DETAILED DESCRIPTION OF THE INVENTION

The following disclosure describes various renderings of preferred embodiments of a dispenser system and hand held dispenser which are featured under the subject mater of the present invention.

Figure 1:
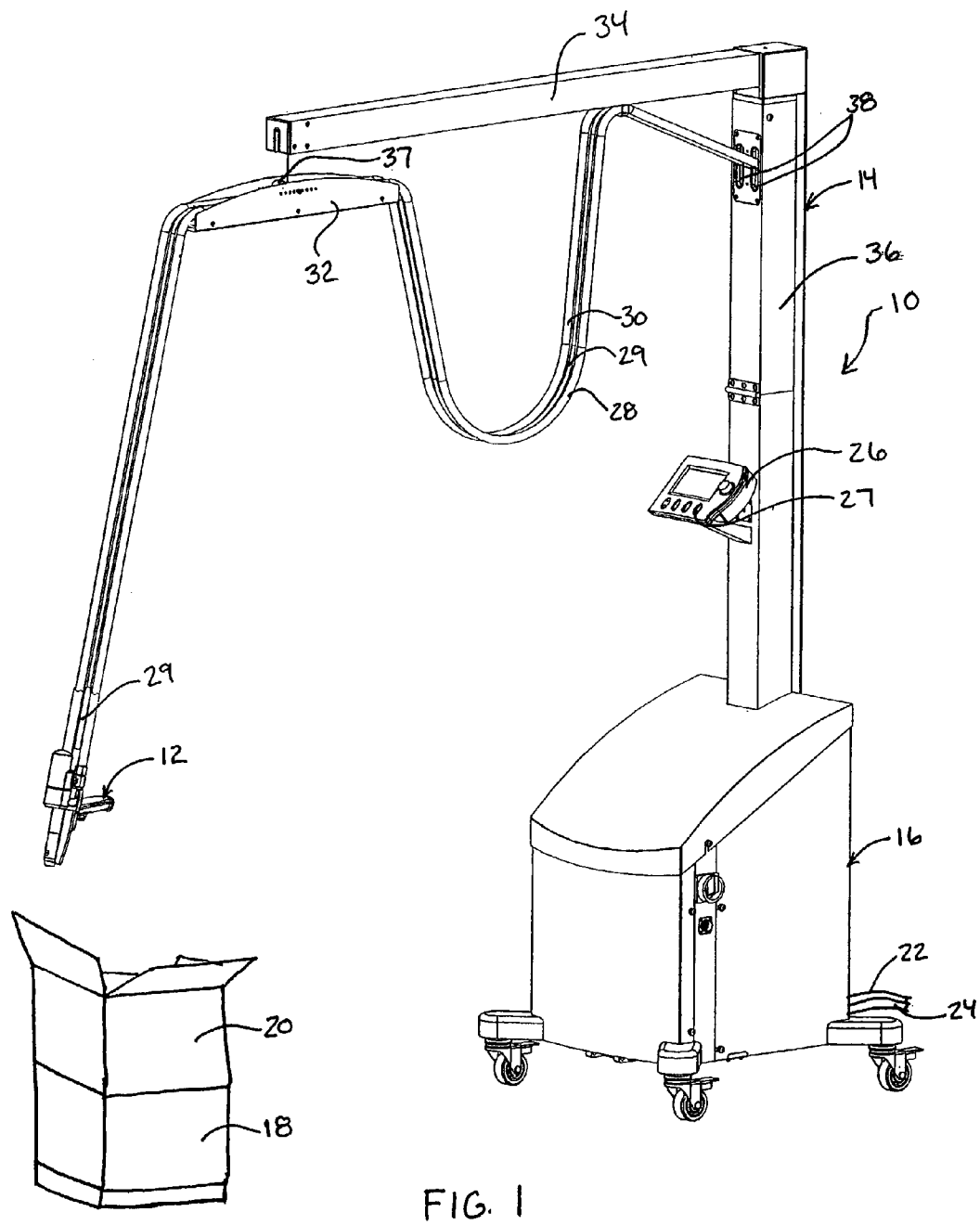
FIG. 1 shows a dispenser system featuring a hand held dispenser and means for supporting and means for supplying drive power and means for supplying dispenser material to the hand held dispenser.

FIG. 1 shows dispenser system 10 with hand held dispenser 12, means for supporting the hand held dispenser 14 and base unit 16. In the illustrated embodiment, base unit 16 provides a housing for components of the supply means for providing a supply of dispenser material to the hand held dispenser. For example, base unit 16 houses a pump system as in a pair of "in-line" pump assemblies such as the gerotor pumps exemplified in PCT publication WO 2004/101245 to Intellipack of Tulsa Okla., USA. These pumps (not shown) receive foam precursor chemical from chemical source lines 22, 24 feeding into base unit 16 and connected at origination end to chemical A and chemical B sources as in chemical drums or larger containers. Various other chemical feed systems for feeding chemical to, from and/or through base unit 16 are also featured as in an "in-barrel" system exemplified by FIG. 5 of U.S. Pat. No. 5,996,848 to Charles Sperry. Base unit 16 also preferably houses the electronics as in the overall system's power board and control system (e.g., processor boards), chemical filtering means, power supply lines, chemical conduit manifolds and pressure sensors, etc. As seen from FIG. 1, heated chemical dispenser supply hoses 28, 30 that extend out from the base unit are threaded through hollow or internally recessed mast 36 and extend out of mast apertures 38 and then on to the rear end of dispenser 12. Extending along together with chemical feed hoses 28, 30 is power supply conduit 29 which in the illustrated embodiment comprises electrical "umbilical" cabling. Attached to mast 36 is control unit interface 26 having means 27 for setting various parameters of the dispenser system 10 through communication with a processor or other control means preferably contained in base unit 16 (e.g., heated hose or dispenser manifold temperature and pressure settings and real time sensed levels).

FIG. 1 further shows boom 34 extending out from the top of mast 36 as part of support means 14 as well as hose hanger 32 receiving chemical feed and power supply hoses 28, 29 and 30. Hose hanger 32 includes a curving reception groove and is connected to a retraction mechanism 37 to provide for suspension of the hose in a balanced setting so that the operator can freely manipulate the hand held dispenser into a desired position relative to the container 20 represented by a box in FIG. 1 but which can take on a variety of forms as in molds, bags, recessed product surfaces, and other foam reception receptacles. In addition, FIG. 1 illustrates container support 18 which in the illustrated embodiment is in the form of a fixed platform but can take on a variety of forms as in a conveyor system, a rotating mold die turntable, or other container support means.

Figure 2:
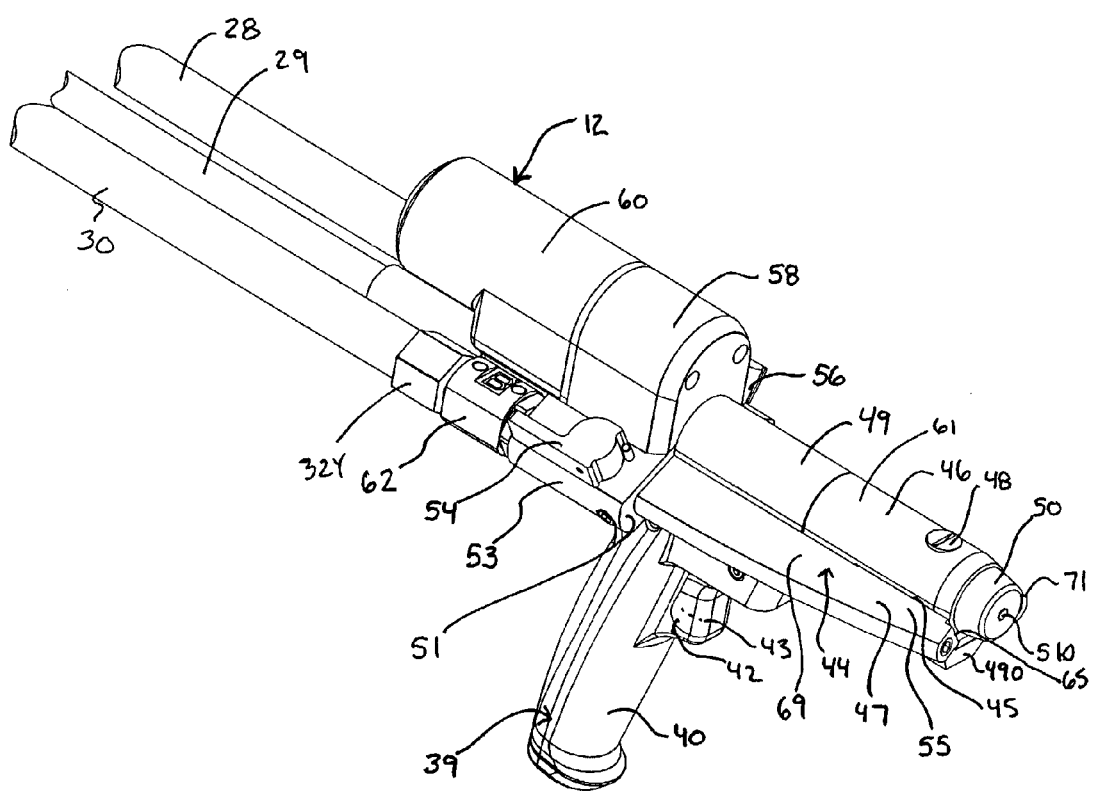
FIG. 2 shows a closer view of the hand held dispenser with the chemical and electrical supply lines shown in cut-away fashion.

FIG. 2 shows a closer view of the hand held dispenser 12 with the chemical and electrical supply lines 28, 29 and 30 shown in cut-away fashion. As shown, dispenser 12 includes handle assembly 39 which includes grasp handle 40 and trigger boot 42 covering and thus protecting trigger assembly 43. The trigger boot 42's preferably made of a flexible, durable material as in a grade of SANTOPRENE™ of AES, limited partnership of Akron, Ohio USA. This plastic material is a thermoplastic vulcanizate (TPV) falling within the family of thermoplastic elastomers (TPE) (e.g., a urethane based elastomer (TPU)) and can be readily secured to grasp handle 40 preferably formed of a less flexible plastic as in DELRIN® from the DuPont Corp.

Secured to the upper end of grasp handle 40 is manifold assembly 44 which includes manifold 47 which converges along its axis of elongation from rear end 53 to its forward most dispensing end 490. The larger rear end 53 has a reception region for the chemical "A" and "B" valve assemblies with shut off valve handles 54 and 56 (shown in the open, dispenser operatable mode and close into the wall as to keep a narrow profile in the operationable dispenser). Between front end 490 and the intermediate border wall 51, which delineates the enlarged rear valve reception area from the streamlined front extension 55 of manifold 47, there is provided a centralized, upper recess 45 in which is received mixing module 46 occupying about ½ of the total length of elongation of the manifold front extension 55. Main transmission housing 49 extends within recess 45 preferably occupying the remaining half of the length of elongation of front extension 55, which extension preferably represents about 60 to 75% of the total length of manifold 47 (front end 490 to the rear end to which swivel fittings 62 and 64 are connected).

As shown in FIG. 2, the diameter of main transmission housing 49 conforms to that of the main body 61 of mixing module 46 and they are placed in direct abutment so as to avoid any step up region or excessive gaps between the two which can be a source of chemical spill build up and removal difficulty. Also, the diameter or periphery of each of housing 49 and main body 61 are in direct abutment with the top edge of side walls 65 and 67 (FIG. 12) partially defining recess 45 to avoid any chemical accumulating gaps in this border region. The wing extensions 69 and 71 have at least an upper surface extending down and out from respective upper recess wall edges to provide a cross-sectionally converging wing section in manifold 47 and the wing extensions further preferably included a curving edge both in cross section and the outer edge of elongation (e.g., the length curvature providing the convergence in the manifold front extension 55). This arrangement also adds to the streamlined configuration which avoids areas that can lead to build up of spilled chemical and/or that cannot be easily cleaned. The front end of the mixing module includes tip 50 which has a conical shape adding to the streamlined, narrowing front convergence of the dispenser. Purging rod 510 is also shown extending out from the central exit passageway formed in tip 50. Solvent access port plug 48 is also illustrated in FIG. 2 as being essentially flush with the surrounding surface of module 46.

Figure 6:
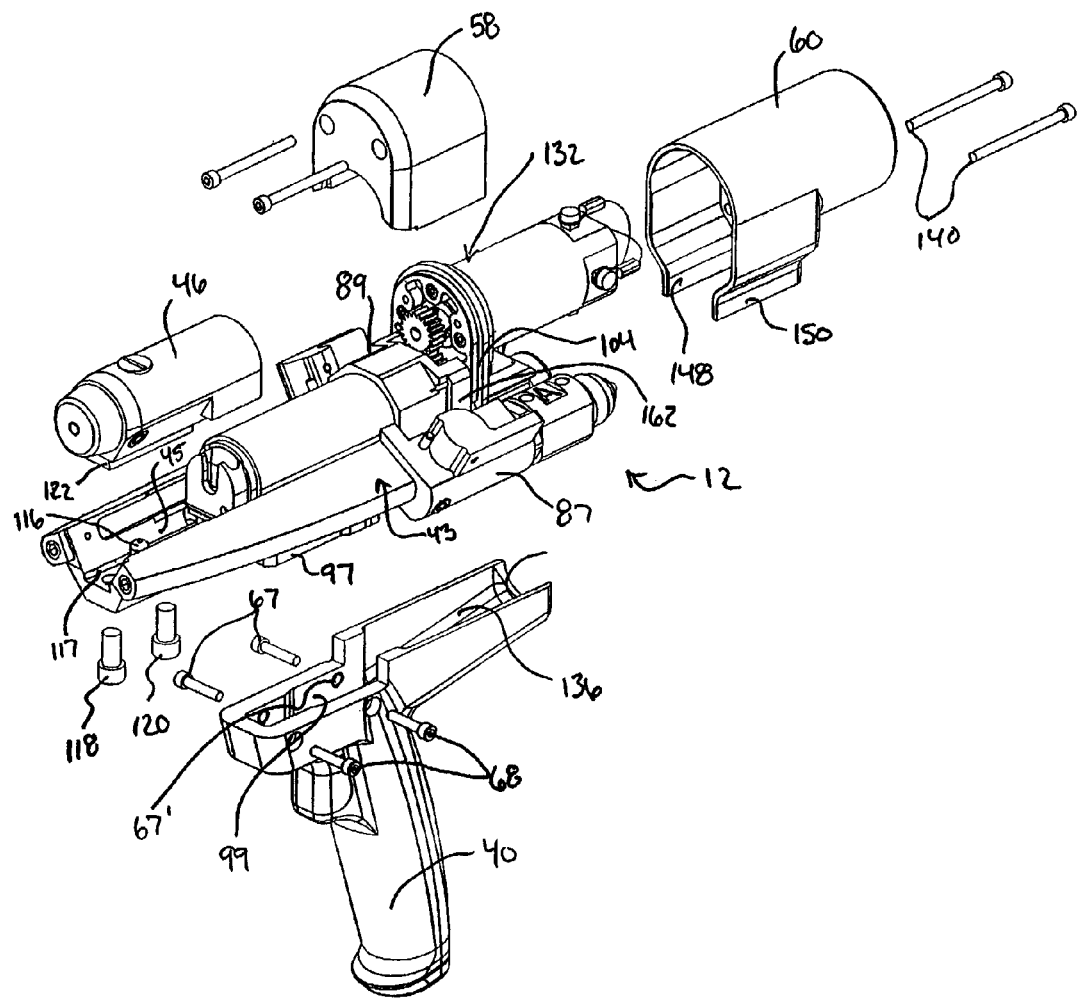
FIG. 6 shows an exploded view of the hand held dispenser shown in FIG. 2.

FIG. 2 further illustrates transmission cover 58 having a forward wall shown commensurate (e.g., on the same plane) with the border wall 51 and also in direct contact with the rear of transmission housing 49. The housing 49 side wall edges are designed to provide a no gap, essentially seamless transition relative to the contacted section of the underlying portion of rear end 53 of the manifold assembly and the adjacent cover 58 and mixing module 46. The rear edge of transmission cover 58 also transcends in an essentially seamless fashion with motor cover 60 having a matching curvature/diameter with the contacting portion of transmission cover 56. Motor cover 60 also has side wall lower edging designed to conform to the rear end portion of manifold 47 with motor cover 60 also extending out in cantilever fashion away from the rear end of the manifold 47 as seen in FIG. 6.

Figure 3:
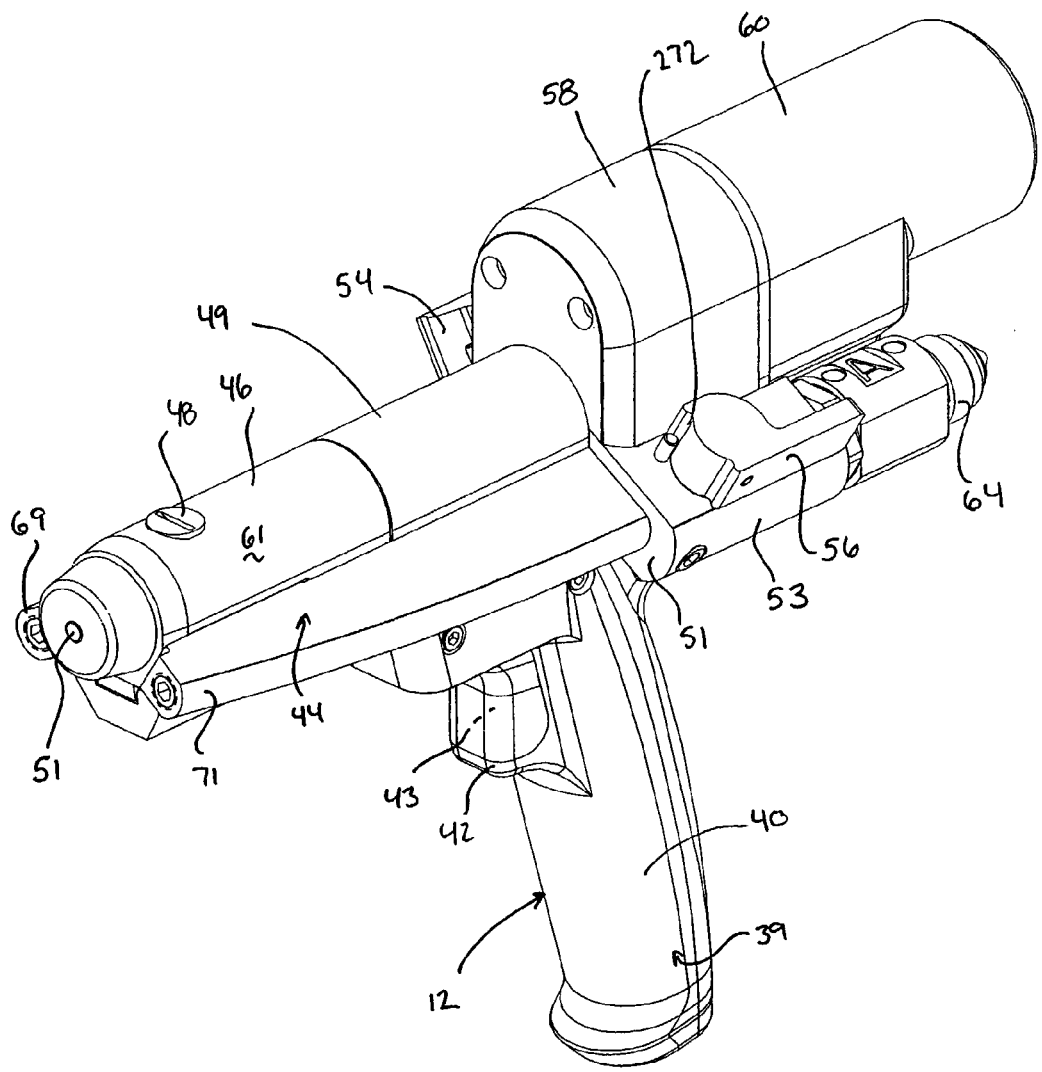
FIG. 3 shows a front perspective view of the hand held dispenser of FIG. 2.

FIG. 3 shows a perspective view (opposite side as that shown in FIG. 2) of the hand held dispenser 12 free of connected chemical and electrical supply lines 28, 29 and 30. As seen, the dispenser is much narrower and more refined than typical hand-held dispensers. This tapering or convergence of the front end region (preferably along the full length of the manifold either with a constant taper in or a stepped tapering in with preferably smooth edging for each segment defining the stepped inside edge manifold) is facilitated by moving the larger components like the valve, the swivel fitting, and the hose connections to the rear of the dispenser as in the rear end wall of the mixing module (e.g., the hose connections having a central axis parallel to the axis of extension of the manifold 47 swivel fitting 62 (64) and also the central axis of the chemical outlet port extending within wing extension 69, 71). For example, in FIG. 2 there can be seen swivel fitting 62 extend out way from the rear wall of the rear end 53 of the manifold just upstream (in direct chemical feed relationship) of the valve assembly casing 53 having shut off handle 54. FIG. 3 shows the opposite side swivel fitting 64 designed for connection with chemical feed hose 30 and also sharing a similar relationship with the valve assembly having shutoff handle 56. This rearrangement of component locations has the ancillary benefits of protecting these components from the effects of chemical and foam contamination, and shifting the center of gravity rearward, which improves the ergonomics for the user.

Figure 3A:
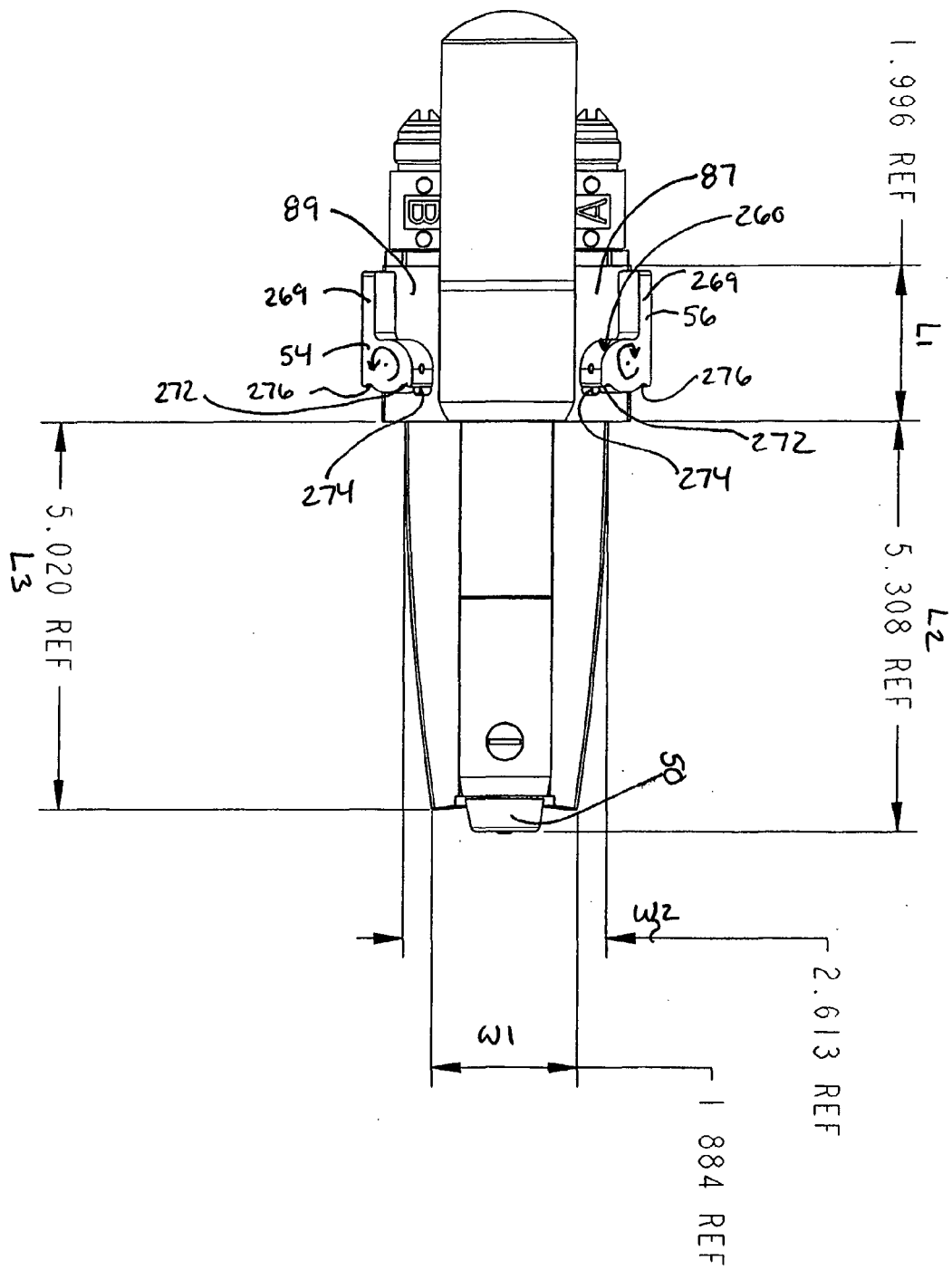
FIG. 3A shows a top plan view of the dispenser.

FIG. 3A provides a top plan view of that which is shown in FIG. 3 with some illustrative (non-limiting) dimensions for the length of the wing extensions L3, length of wing extensions plus the slightly forward extending hardened tip 50, and the rear end plus valve casings L1. The total length of the dispenser manifold being L1+L2+L3 with the swivel fitting length preferably being about equal to L1.

FIG. 4 shows a rear view of the hand held dispenser 12 and shows the rear end of the cantilevered motor cover 60 having a back end wall placed axially rearward of the swivel fittings due to its cantilever extension off from manifold 44. FIG. 4 also shows the electrical line connector 80 which is centered (widthwise of manifold) between the two chemical line swivel fittings 62, 64 and slightly raised above those connections to provide an electrical line infeed port 81 for friction or plug in connection of electrical umbilical cable 29 (e.g. a bundle of wires for feeding electrical power to the motor and other electrical components and for allowing for communication of sensed parameters as in for the below described temperature sensor and manifold heater combination).

FIGS. 4A and 4B illustrate a preferred male/female friction fit plug in arrangement with connector 80 preferably being fixedly secured to the rear end of the dispenser and having the larger diameter female portion and the interior 80i male connection section as shown in FIG. 4B and electrical connector section 700 which is crimply adhered, screwed and/or otherwise fixed to the end of umbilical cable 29 and preferably has a male extension member 702 (or vice versa with respect to male/female connectors) designed for receipt within to outer cylindrical wall 80t and over section 80i to electrically connect the interior electrical lines. The connection is preferably fluid tight (e.g., solvent or chemical) and can include extra grasping components as in a toolers, hand releasable deflectable tab (not shown) engageable with recesses as in recess 704).

Figure 5:
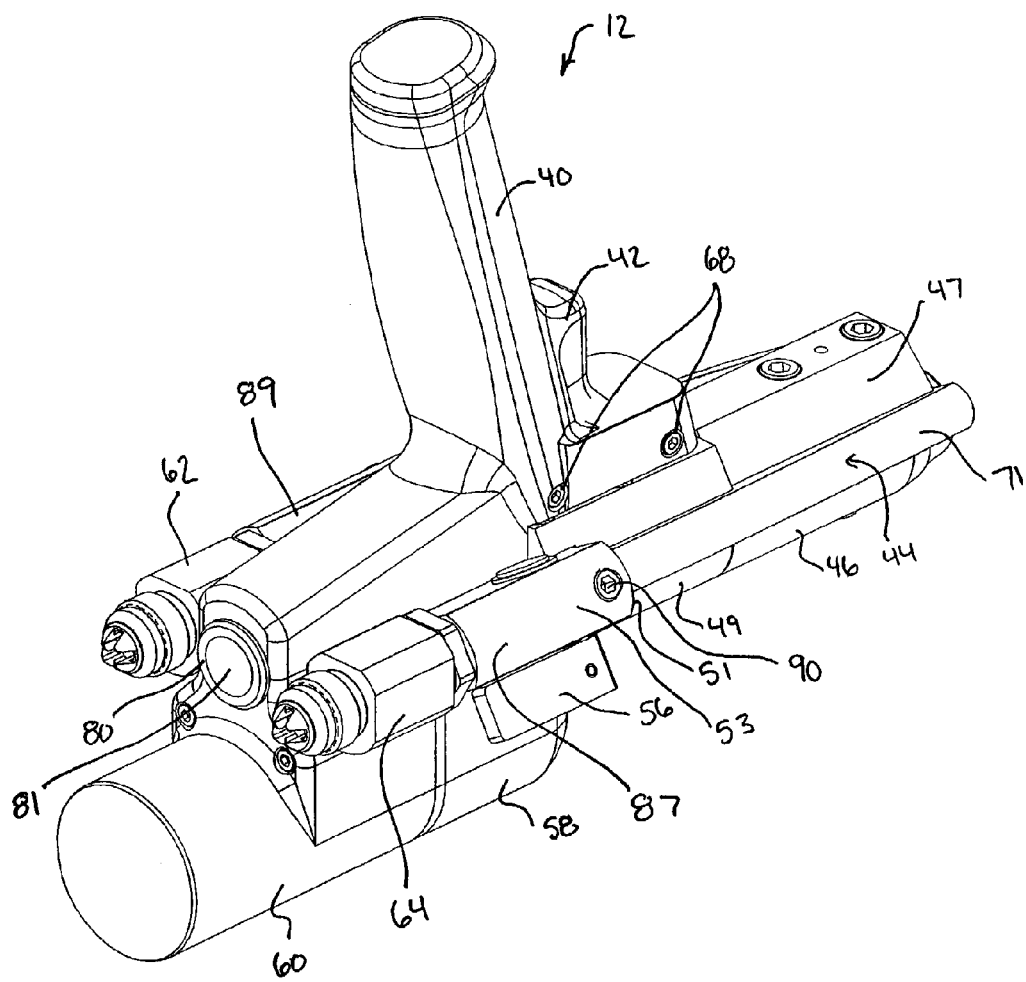
FIG. 5 shows a bottom or underside perspective view of the hand held dispenser in FIG. 2.
Figure 7:
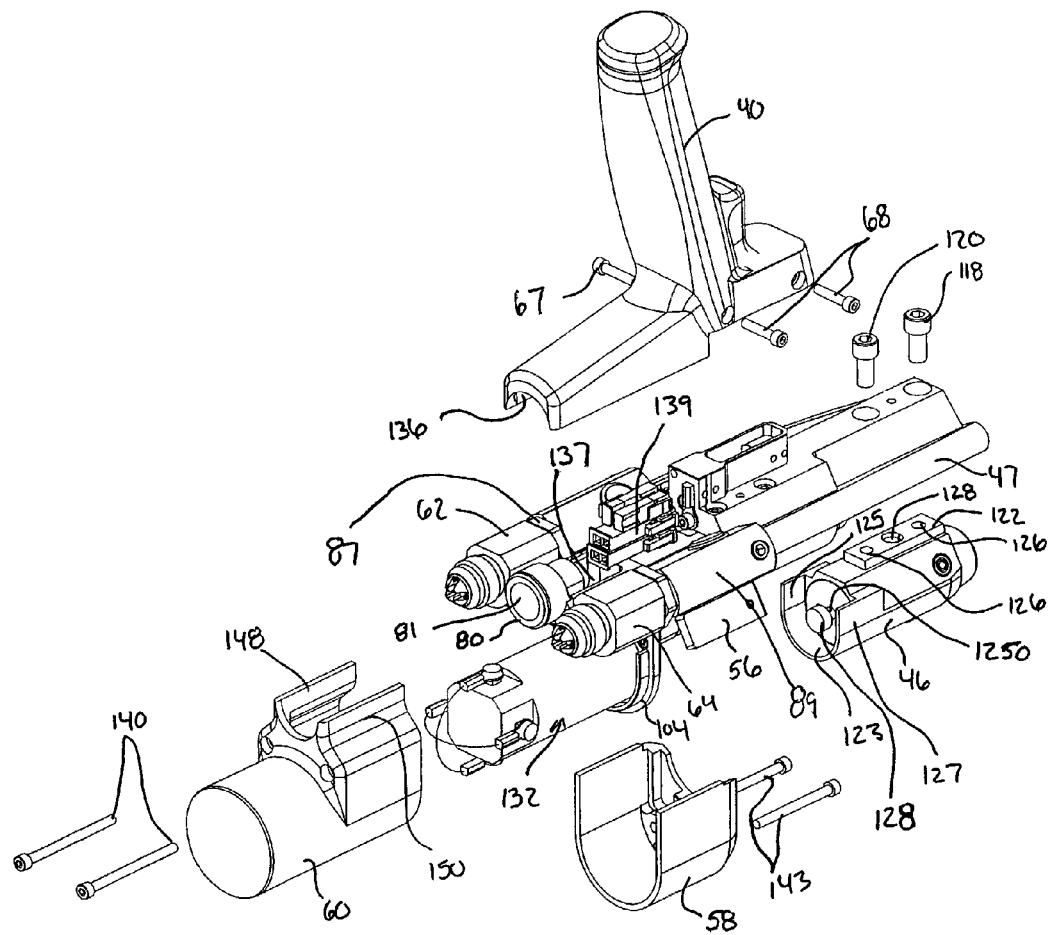
FIG. 7 shows an exploded (underside) view of the hand held dispenser of FIG. 2.

FIG. 5 shows an underside, perspective view of the dispenser and FIG. 7 an exploded view of the same. As seen in FIG. 5 a preferred embodiment of the dispenser features an electric dispenser (e.g., a urethane material dispenser) having the electrical receptacle or electrical line connector 80 formed at the rear end of connection extension 137 of drive train assembly 132 (see FIG. 12) which includes a block 139 of various electrical plug receptacles or in other words an electrical interface assembly. Connection extension 137 is mounted within cavity 136 (FIG. 6) provided in the rear region of the grasp handle 40 and is surrounded by the flanged portion 134 (FIG. 6) of the grasp handle so as to position connector 80 in its ready to receive umbilical cable 29 position. Flanged portion 134 partially defines the reception cavity 136 formed at the upper rear end grasp handle 40 that provides a reception region for the rear lower region of drive train assembly 132 and thus houses the connection extension 137 with electrical interface assembly 139 in electrical communication with plug-in connector 80. As noted above, the electrical line plug in connector 80 is preferably designed for a friction only connection with the friction level sufficiently retaining connection (e.g., friction through one or more surface wall contacts as in a unitary outer cylindrical (solid or hollowed out) push-pull plug or a multi-prong plug in device or a combination of the same (e.g., a cylindrical outer male sheath with interior multi-prong set)). A preferred embodiment of connector 80 features a cup shaped connector port within which is inserted the free end connector 700 of an electrical power supply cable 29. The receptacle shown on the handle can either constitute the female receptacle portion, or the male receptacle portion or both (e.g., a hollow cylindrical with single or multi-prong male connection member). Also, additional securement means can be provided as in the inclusion of mechanical latching (e.g., releasable spring biased clamps or fasten down mechanical connectors which provides extra security against electrical feed line/dispenser pull apart, but also can increase replacement system down time). The high friction push-pull plug connector 80 illustrated in FIGS. 4B, 4C and 5 is preferred as is sufficient for most usages free of a need for added mechanical fastening and is thus preferred from this standpoint. A preferred embodiment features a "Lemo" connector which is in reference to plug products produced by the Lemo company of Switzerland with FIGS. 4B and 4C being illustrative. Previous dispenser designs had a strain relief on the rear of the handle that secured a pigtail wire, and the connection was in line and two to three feet up the hose from the dispenser. The illustrated connector 80 avoids this while still providing a secure electrical connection.

FIG. 5 also shows swivel fittings 62, 64 extending together with a portion of the manifold valve housing extension sections 87 and 89 which extend along (same common central axis of elongation) and to opposite sides of the butt end of the gun shaped grasp handle such that the swivel connectors 62 and 64 forward end lies at about the same plane location as the butt end of the grasp handle 40 and close laterally thereto (less than a one or two cm spacing between the outer side of the butt portion of the grasp handle and the interior side of the closest swivel fitting and commonly configured swivel connection extensions 87 and 89 of the manifold 44).

FIG. 5 also shows plug 90 which plugs/seals a clean out port that extends into manifold valve housing sections 87 and 89 for facilitating cleaning of the relatively long chemical flow passage through the manifold and preferably is sized about the same size as the chemical passageway in the manifold wing extension 69, 71 (e.g., not more than 25% larger than that portion of the chemical passageway as in less than ⅜ inch such as a ¼ inch threaded reception hole for a similarly size port cap). FIG. 5 also illustrates manifold to grasp handle securement means which in a preferred embodiment includes two pairs of fastening screws represented by pairs 67 and 68 in FIGS. 2 and 3 which work in conjunction with male member 97 (e.g. a protruding platform) of manifold 47 designed to snugly fit within forward cavity 99 formed at the top of grasp handle 40 and align respective fastener reception holes (e.g., 67') in both the handle 40 and the male platform projection 97 (see FIG. 7). FIGS. 5, 6 and 7 also illustrate securement means (e.g., threaded fasteners 118, 120) for securing the mixing module 48 within the recess 45 provided in manifold 44. A preferred embodiment features a male securement plate 122 of mixing module 46 having threaded apertures 126 designed for receipt of fasteners 118 and 120 and a central pin reception recess 128 designed to receive pin 116 (the male female connections are shown in preferred orientation but can be reversed relative to the components being connected). As with the handle to manifold connection, there is preferably a surrounding wall 117 that is designed to snugly accommodate the projecting member of the component being fastened as in the mixing module 46 being accommodated by the manifold.

Figure 12:
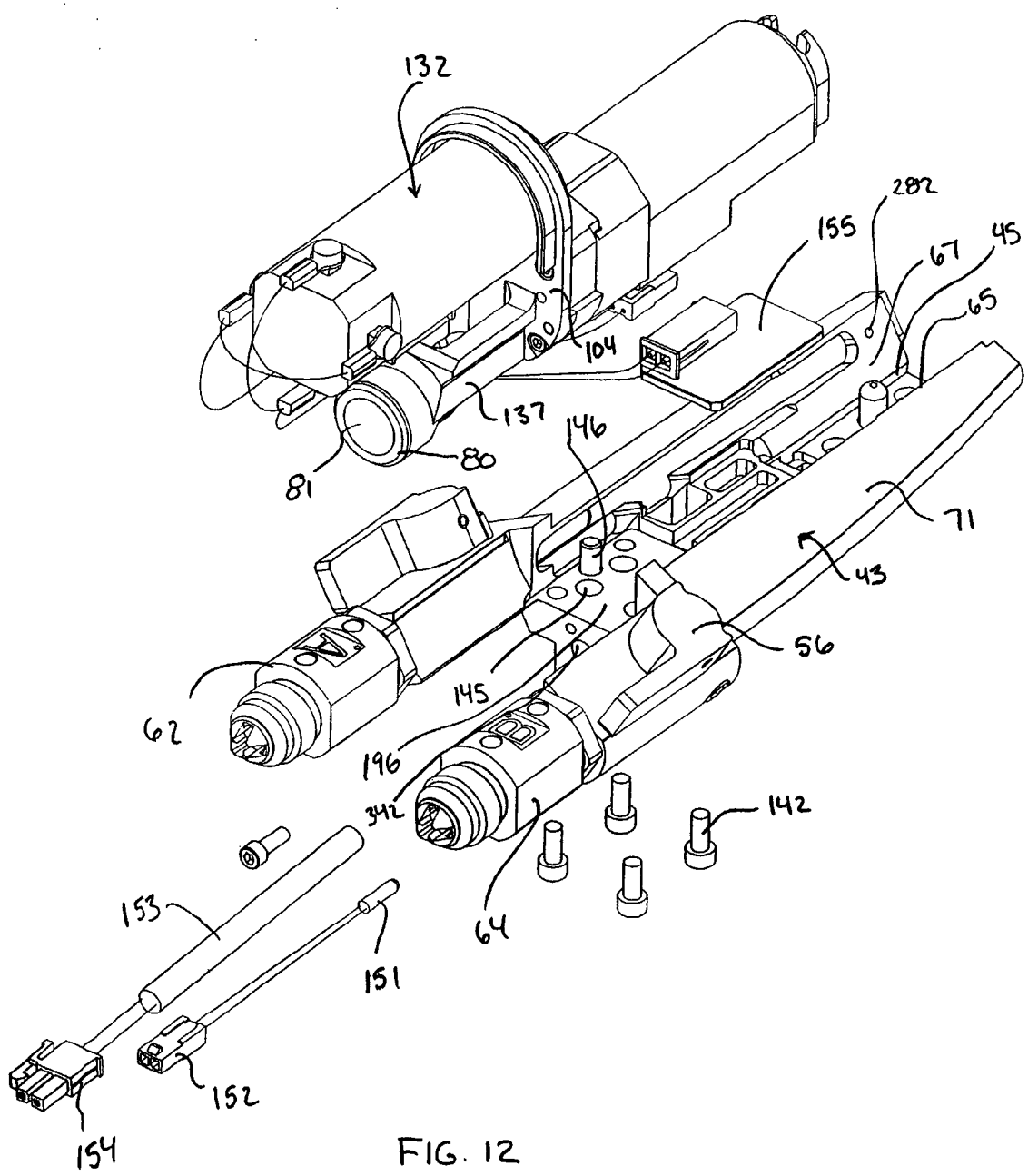
FIG. 12 shows an exploded view of the drive train assembly and the manifold assembly.

FIGS. 6 and 7 provide an upper and lower partial exploded view of the hand held dispenser 12 and thus shows how the front transmission cover 58, motor cover 60, mixing module 46, and the handle 40 are configured individually and attached. The non-exploded out portion of FIG. 6 includes the drive train assembly 132 in attachment with manifold assembly 43. As seen by FIG. 12 the attachment of drive train assembly 132 to manifold assembly 43 is by way of fasteners 142 (four shown as this is a component having high torque and vibration characteristics) extending through apertures 145 formed in the rear reception region 144 formed in manifold 47 with the connection also preferably having a pin 146 and pin reception cavity (not shown) relationship. With this stable combination of drive assembly connected to manifold and manifold connected to the grasp handle, the attachment of motor cover and transmission cover 60 is preferably by way of the motor cover being secured by fasteners 140 (FIG. 6) to the base of the drive assembly and with side skirts 148 and 150 having curved edge regions designed to extend between the drive train assembly 132 and the valve enclosing swivel connection extensions 87 and 89 to provide an essentially seamless contact relationship between the skirts and the contacted components therebelow and between. Transmission cover 58 is secured directly to the motor cover by way of fasteners 143 to complete the dispenser's outer configuration.

FIG. 7 also illustrates cowl 123 formed by flanged extensions 125 and 127 extending off the main body 61 of mixing module 46 to the drive transmission housing 49 so as to cover over the reciprocating connection end 128 of reciprocation rod 1250. An opposite arrangement is also possible with the cowl on the transmission housing.

Figure 8:
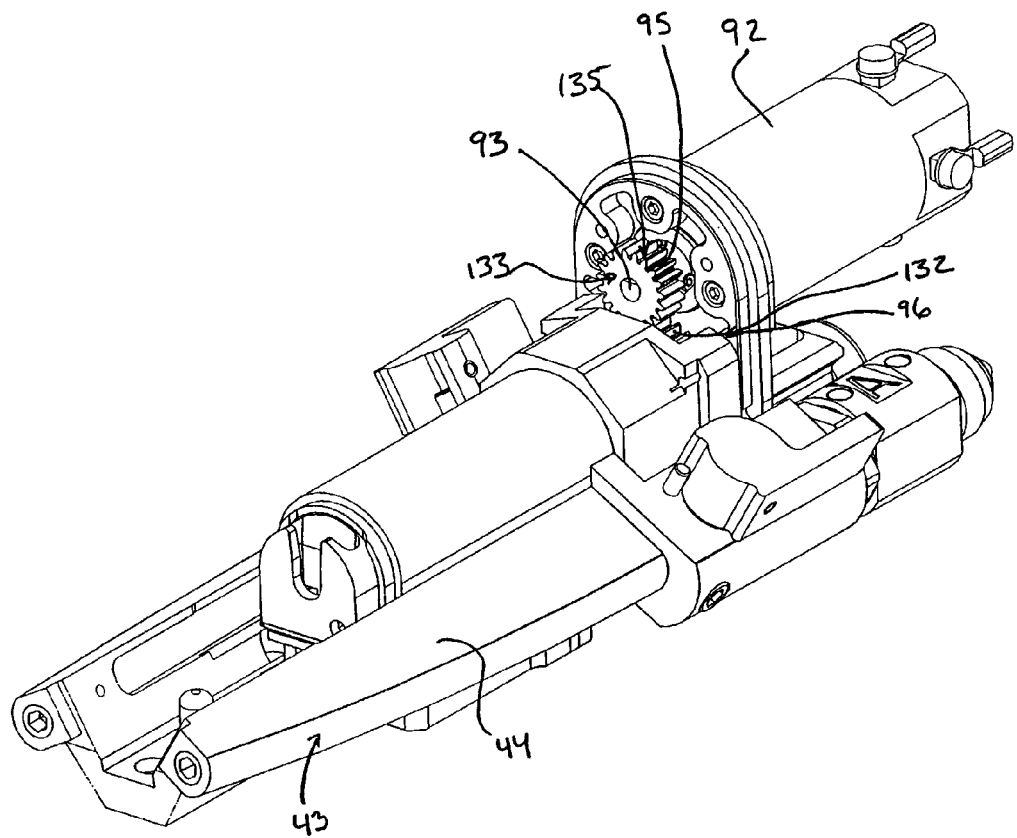
FIG. 8 shows the drive train assembly installed on the manifold assembly.
Figure 11:
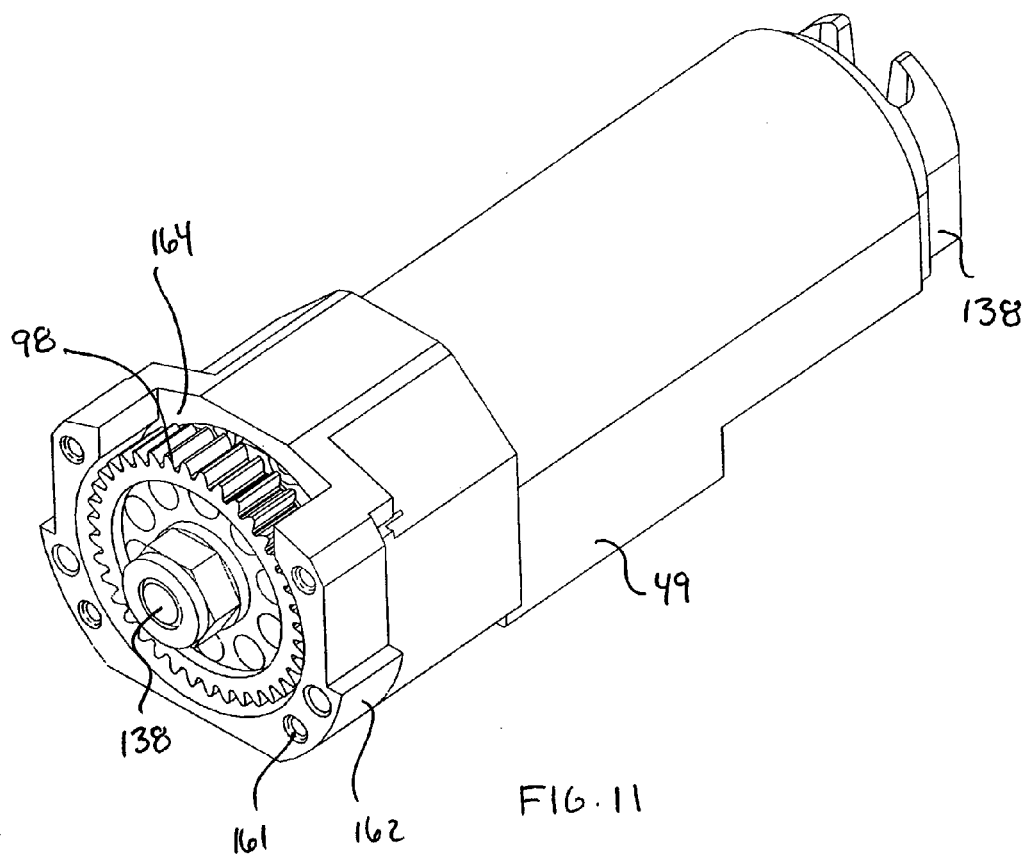
FIG. 11 shows the ball screw transmission in its housing.

FIG. 8 illustrates drive train assembly 132 or drive means of the present invention mounted to manifold assembly 43 with FIG. 12 showing an exploded view of the same. The illustrated drive train assembly 132 comprises motor 92 and transmission system 133 provided for transmitting the motor's drive output from motor drive shaft 93 to the reciprocating valve or purge rod 1250 provided in the mixing module 46. Motor 92 is preferably an electric brush motor having a length of, for example, 50 to 100 mm (e.g., about 75 mm±10) with a shaft speed of 2000 to 3000 RPM (e.g., 2400±75 RPM) and a rated torque of 0.75 to 1.25 NM (e.g., 09±0.01 N.M) and a weight of 250 g to 350 g (e.g., 300±25 g). A suitable motor includes a Moog Components Group of Blacksburg, Va. USA, brush motor #C 13-L28-W10 with a customized flat sided shaft. A variety of other drive types are also featured under the present invention but electric motors like those described above provide a light weight choice and are suitably powered with the arrangement of the present invention to help avoid lock ups of the reciprocating rod. That is, the subject matter of the invention is not limited to the illustrated driver but can include alternate driving means as in fluid based (e.g. piston reciprocation with air line, hydraulic manipulation, vacuum based) or alternate electrical based systems as in magnetic attraction as in an electro-magnet, solenoid, etc., based system, mechanical systems as in full train gear systems, belt, etc. but the electric motor works well in the preferred, disclosed manifold variations in the drive assembly are also possible, if a direct engagement with the driver is ill suited for the set up which transmissions are designed to conform well with the driver type. The illustrated transmission system 133 includes ball screw transmission assembly 138 and gear train 135 comprising first gear 96 meshed with second gear 98. Second gear 98 is secured to the screw drive shaft of ball screw transmission assembly 138 (FIG. 11). FIG. 8 further illustrates the drive train assembly 132 comprising, in addition to motor 92 and transmission assembly 133 (e.g., ball screw), the motor mount 104 and main transmission housing 49 which houses ball screw transmission assembly 138.

Figure 9:
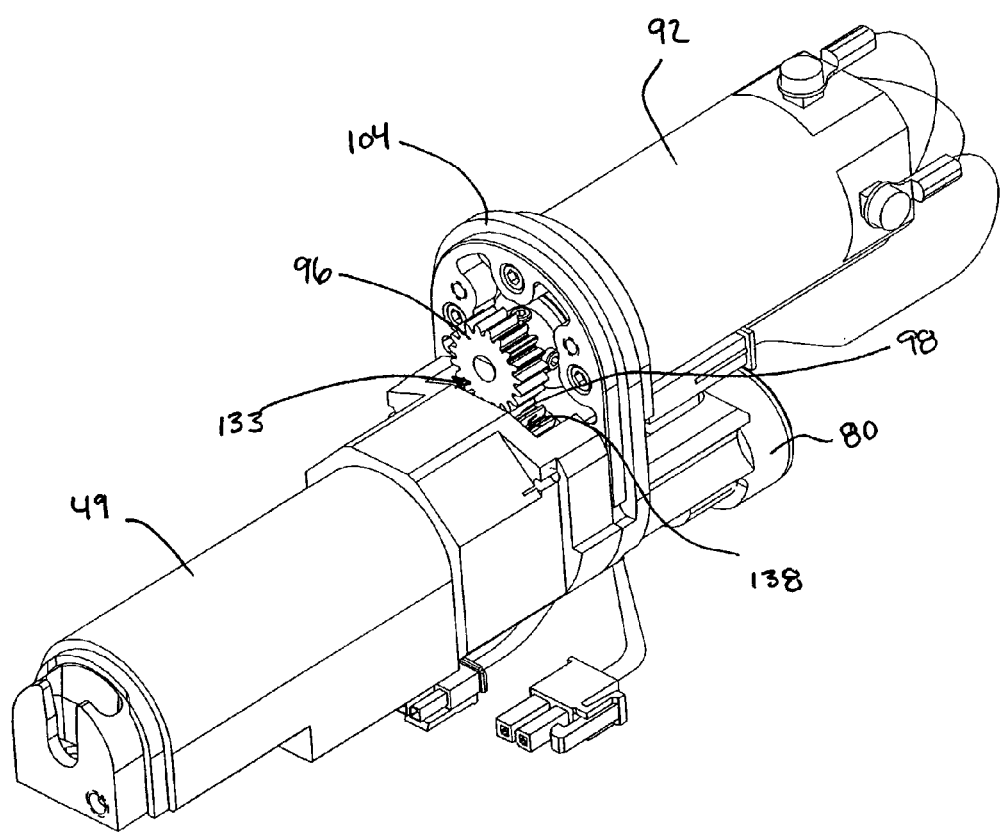
FIG. 9 shows the drive train assembly alone.
Figure 10:
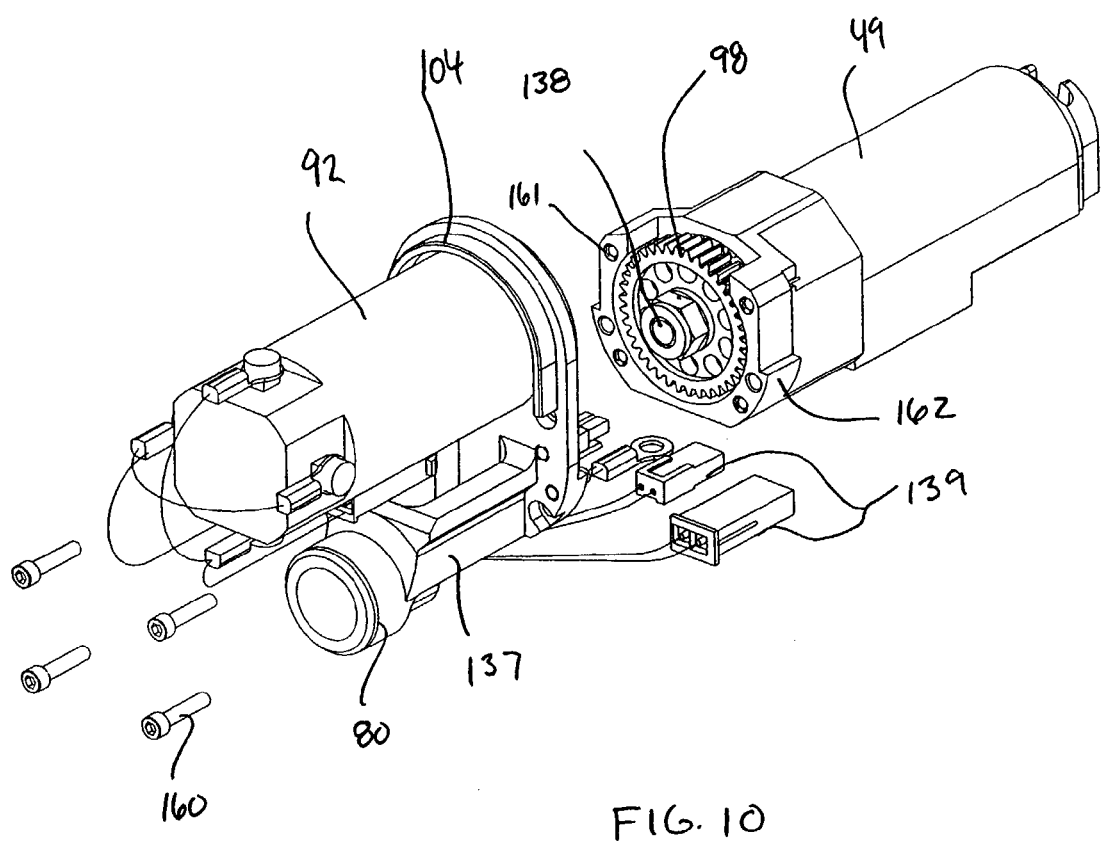
FIG. 10 shows a partially exploded view of the drive train assembly.

FIG. 8 shows the drive train assembly 132 of a preferred embodiment of the invention mounted to the manifold assembly 43, while FIG. 9 shows drive train assembly 132 removed from manifold assembly 43. FIG. 10 shows the subcombination of motor 92, motor mount 104, and electrical extension 137 with connector 80 and the various electrical receptacles 139. FIG. 10 further illustrates the stable mounting of motor 92 (via fasteners 800—FIG. 6) and transmission housing 49 to motor mount 104 through fasteners 160 which extend through holes in mount 104 and into threaded recesses 161 provided in thickened shroud 162 which surrounds and covers over second gear 98 to keep it protected from contamination. Shroud 162 has an open slotted top section which exposes gear 98 for contact with first gear 96 connected to the drive shaft of motor 92 with motor mount 104 providing the proper spacing and orientation.

FIG. 1 shows transmission housing 49 and the housed ball screw transmission assembly 138 together with second gear 98 fixed to the input end 166 of shaft 168 (FIG. 13) of the ball screw assembly and protected by the surrounding shroud provided by transmission housing 49. FIG. 12 provides a view of the drive train assembly 132 and how it attaches to the manifold assembly 43 (e.g., with four screws 142). In addition, FIG. 12 shows thermistor 151 and associated electrical connector 152 which is in electrical communication with the main power umbilical cable 29 in engagement with connector 80, and cartridge heater 153 with associated electrical connector 154. Heater 153 is preferably a cartridge heater that is controllable in temperature with high precision (e.g., ±1 or 2° F.). A suitable cartridge heater is available from Heatrod Inc. of Leavenworth, Kans. USA as in a (preferably non-stick type) cartridge heater with for example 0.25 to 1 cm diameter (e.g., 0.5 cm) having a length of 2 to 4 inch as in a 3 inch long cartridge heater with 120 to 150 Watts (e.g., 130 to 140 W) being illustrative. Heater 153 is preferably one that provides closed loop temperature control for the manifold assembly, in a fashion directed at removing any cold-shot potential. This is achieved through monitoring with a control unit in, for example, the base unit 16 of manifold temperature with thermistor 151 (which knowing the conductivity of the manifold and closeness to chemical passage enables a close approximation of chemical temperature) and adjustments on a closed loop basis of the cartridge heater 153 to have the system meet the desired chemical temperature setting which can be input via interface 26. FIG. 12 also shows an anti-rotation (e.g., elastomeric) pad 155 for contact with the transmission housing to help prevent housing rotation counter to transmission rotation.

Figure 13:
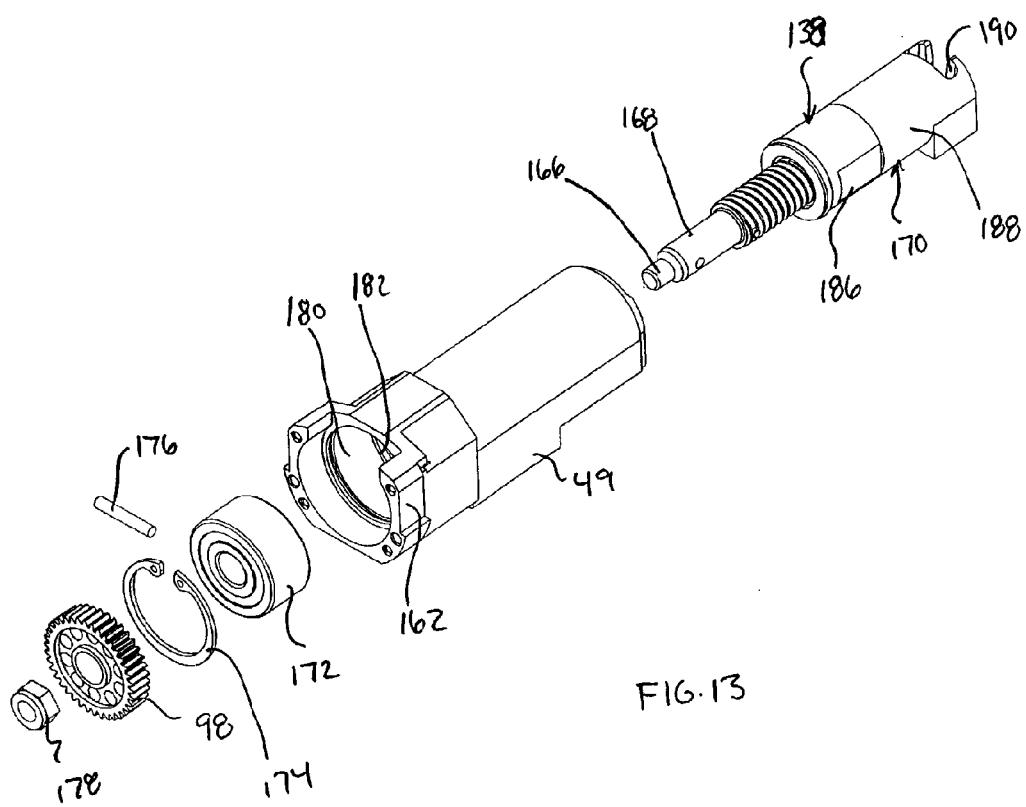
FIG. 13 shows an exploded view of that which is shown in FIG. 11.

FIG. 13 shows an exploded view of a preferred ball screw transmission assembly 138 comprising ball screw drive 170, shaft supporting bearing assembly 172, bearing retention clip 174, retention pin 176, threaded fastener 178 designed to secure to shaft end 166 and lock in position hardened steel gear 98. Transmission housing 49 has a recessed region 180 just inward of shroud 162 designed to receive and hold in place bearing assembly 172. Clip 174 holds axially in place bearing assembly 172 with the help of the receiving stepped shoulder portion 182 defining recessed region 180. The opposite and 184 of transmission housing 49 houses ball screw nut 186 (FIG. 15) in contact with puller 188 having exposed capture device 190 shown as having a capture recess 192 for engagement with the engagement head 128 of rod 1250 (FIG. 7).

Figure 14:
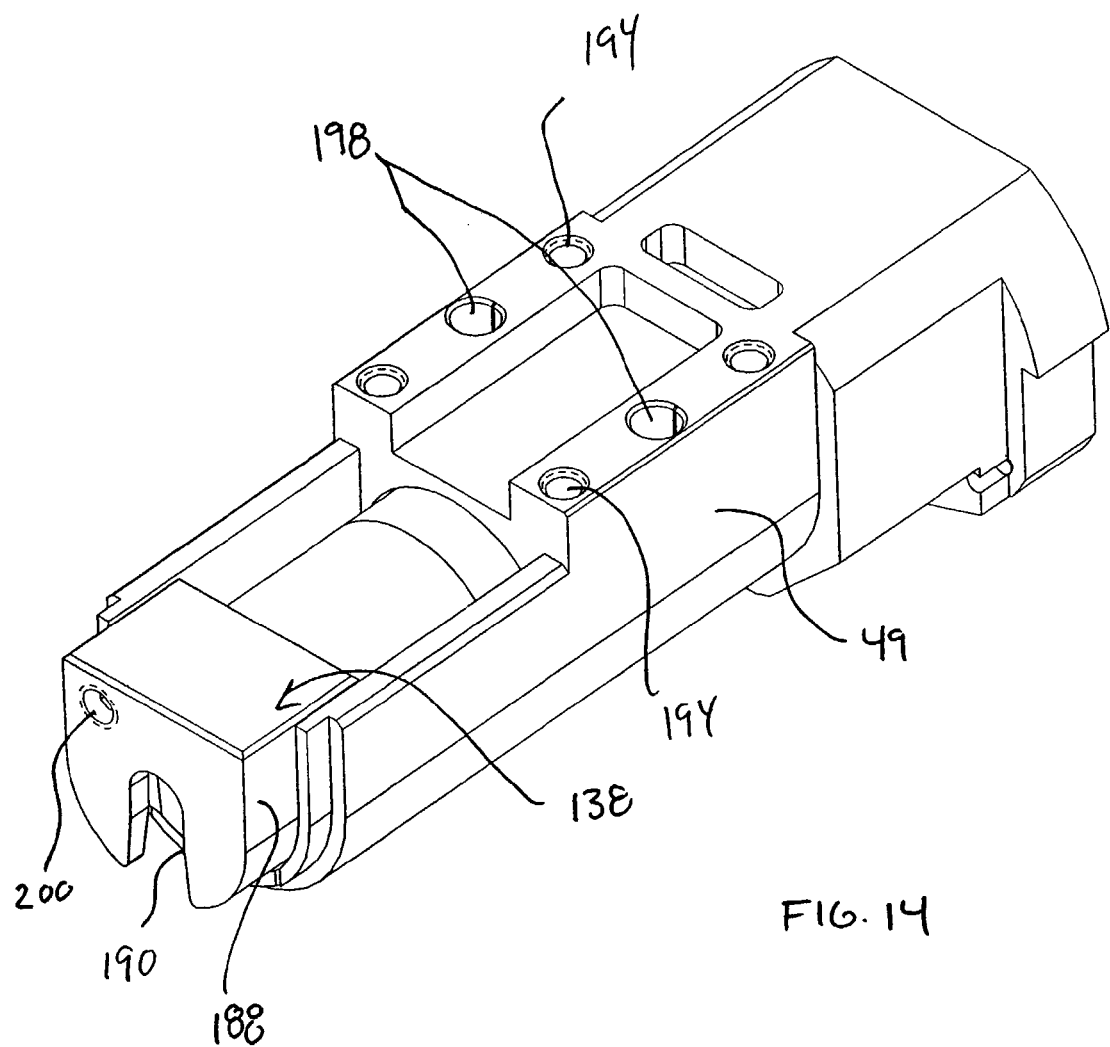
FIG. 14 shows an underside view of that which is shown in FIG. 11

FIG. 14 illustrates the underside of transmission housing 49, which is placed in engagement with surface 196 of manifold 44 via the threaded fasteners 142 extending through manifold apertures 145 and into threaded engagement with thread holes 194 and via pins 146 (one shown FIG. 12) received by pin apertures 198. FIG. 14 also illustrates puller 188 lubricant port 200 with threaded plug 202 shown in FIG. 15.

Figure 15:
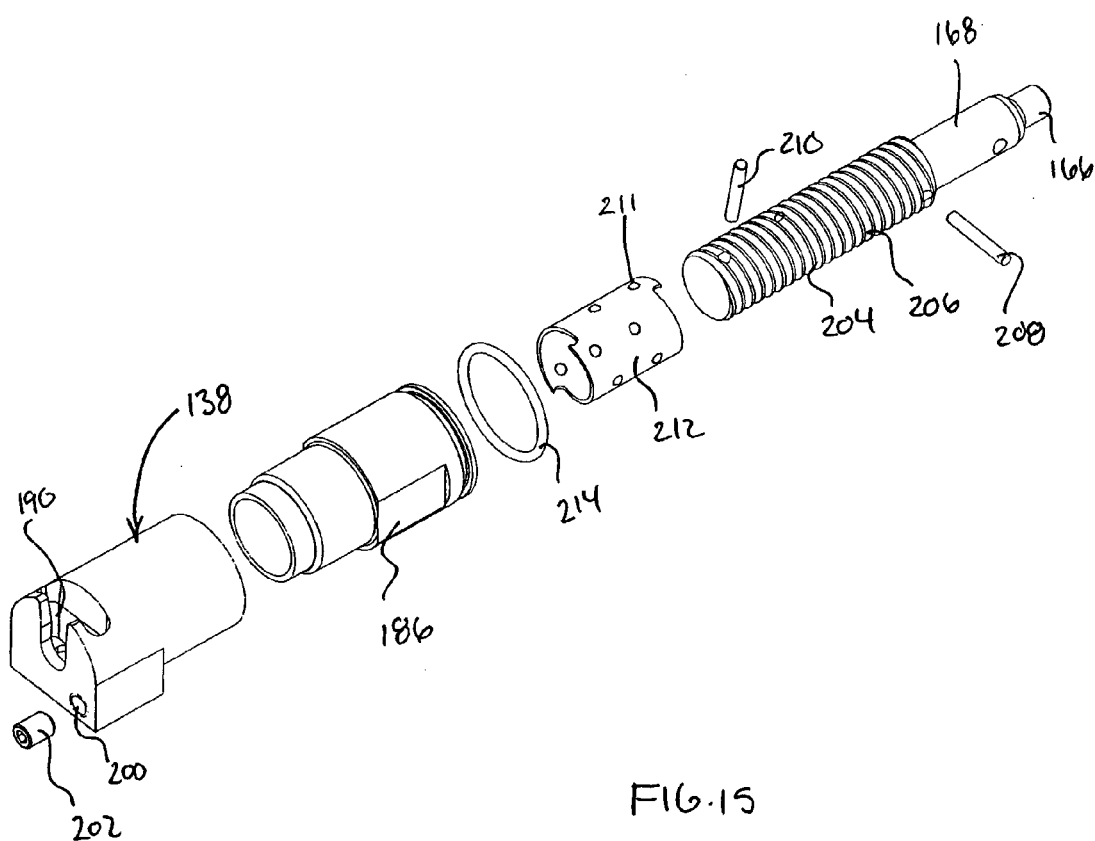
FIG. 15 shows an exploded view of the ball screw transmission assembly.

FIG. 15 illustrates ball screw assembly 138 in exploded view comprising ball screw 204 with threaded section 206 receiving pins 208, 210 held by cage 212. Cage 212 thus includes one or more roller bearings 211 that ride in the grooves of the ball screw 204 which cage is received within nut 186 together with o-ring 214. FIG. 15 further illustrates ball screw nut 186 also having a telescoping relationship with puller 188. Threaded section 206 is preferably designed with a pitch angle of less than 11° and more preferably 9° or less as in 5.5°±1°. Also, the central axis of the ball screw is preferably positioned parallel with that of the central axis of the motor and at a spacing $r_1$ plus $r_2$ of the first and second gears 96, 98 (their radius to outer edge) with the motor being compact with a cylindrical casing having the drive shaft at the cylinder's central axis and the radius of that casing placing the lower edge of the motor casing within, for example, 1 or 2 cm of the ball bearing shaft's 168 central axis with a preferred embodiment placing the motor casing essentially at the same height level as the ball screw shaft's central axis. The distance between the ball screw shaft's central axis and the central axis of the motors drive shaft is preferably less than 1.5 inches, more preferably 0.75 to 1.25 inches as in 0.9±0.1 inch.

Also relative to gears 96, 98, the Table I below illustrates some of the advantages of a preferred gear train embodiment of the present invention has over a representative prior art design.

TABLE I

| | Preferred Embodiment(s) of Invention | Representative Prior Art | Comments |
| --- | --- | --- | --- |
| Gear Material | Hardened Steel | Aluminum and/or Plastic | Hardened steel gears will outlast aluminum and plastic gears by many times |
| Width of Gear Face | .250 inches | .125 inches | Thicker gears last longer than thinner ones |
| Number of Gears | Two | Four | Fewer gears in the drive train results in a smoother running and more reliable system. |
| Number of Gear Shafts | Two | Three | Gears with precise spacing provide greatest life span. Precision shaft spacings are much less costly to machine if you have fewer shafts to deal with. |

Thus, upon the driver motor 92 being actuated by the control unit (multi-directional motor or uni-directional) the rotation of ball screw shaft 168 is imparted via the ball screw threads which, in turn, imparts movement into puller 188 and, in turn, to the reciprocating rod 1250 to achieve the purging and/or valving function of purge rod within mixing module 46 with a valving embodiment releasing chemical A and B into the mixing module where upon the pressurized chemical is dispensed out tip 50 of the dispenser 12.

Figure 16:
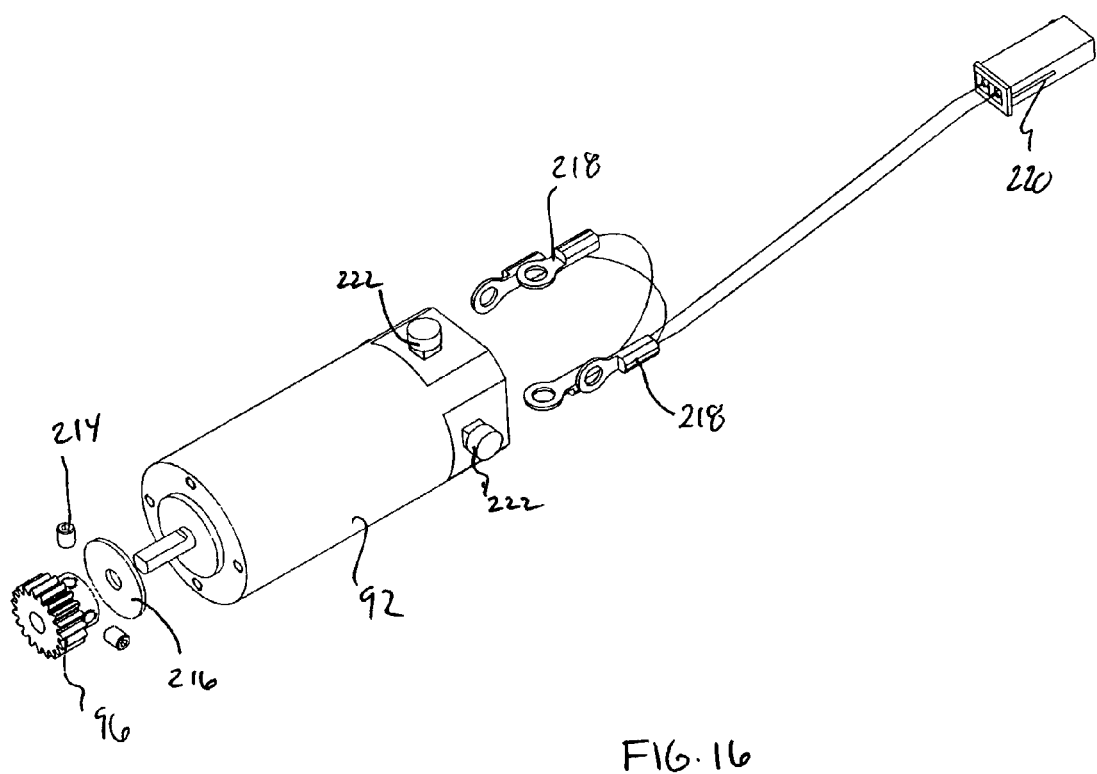
FIG. 16 shows an exploded view of the motor with drive gear.

Motor 92 is shown if FIG. 16 with the first gear 96 which is located with shaft locking pins 214 (preferably with a drive shaft/gear containing flat side(s) added securement feature) and grease seal gasket 216 on the central shaft. The electrical leads 218 for the brush motor and electric plug in cartridge 220 preferably connect with a receptacle forming part of electrical connection block 139 (FIG. 7). As further shown if FIG. 16, motor 92 has electrical threaded clamp connectors 222 at recessed backend regions which facilitate unobstructed wiring connections between motor 92 and cartridge 220 and a streamlined configuration for motor cover 60.

Figure 17:
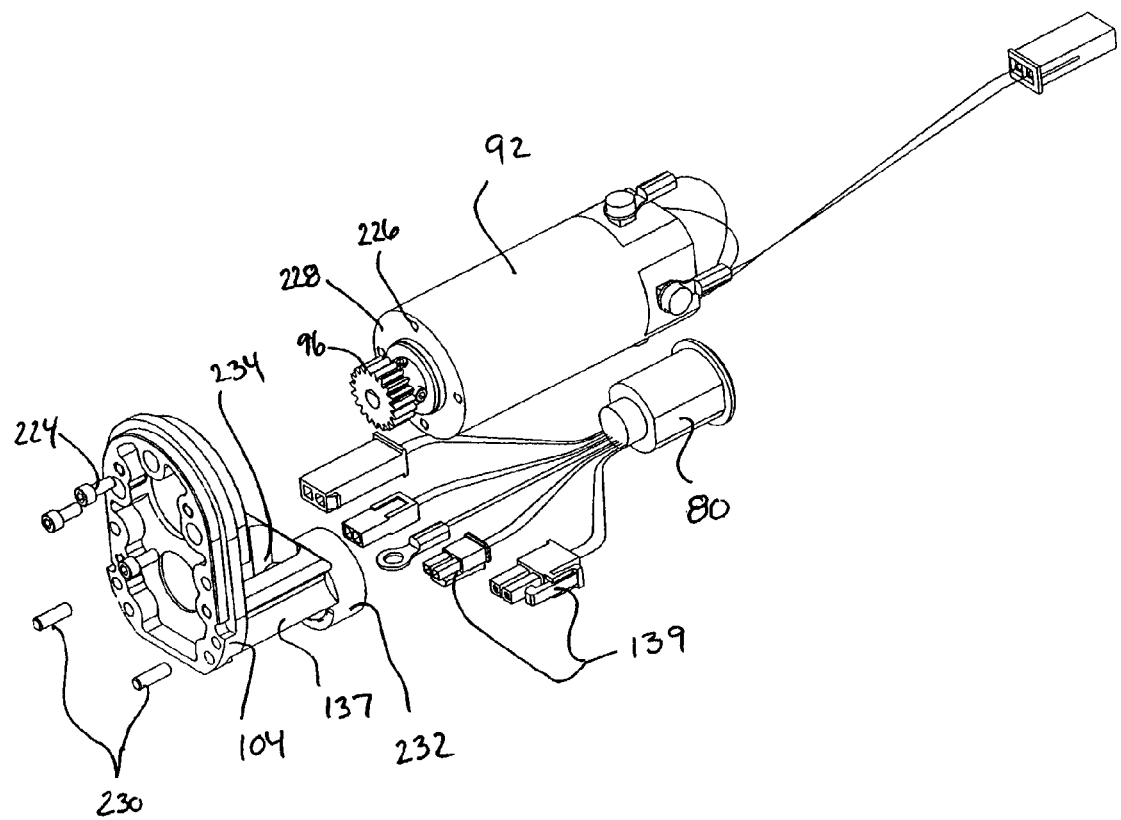
FIG. 17 shows an exploded view of the motor, motor mount and electrical connector and harness.
Figure 18:
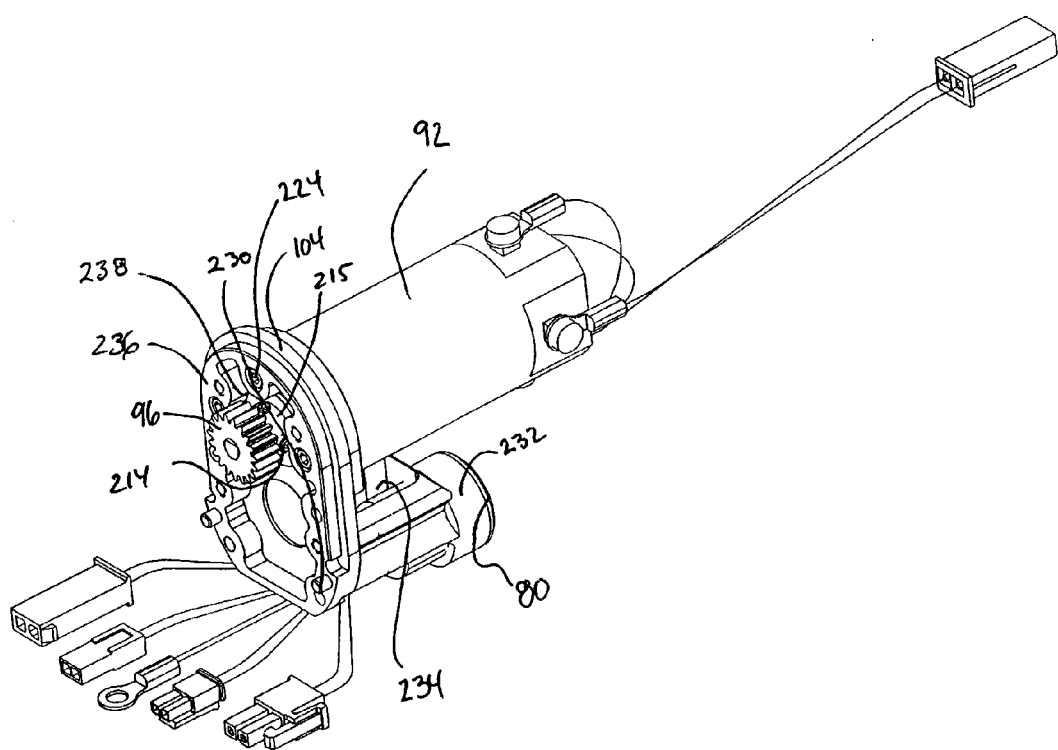
FIG. 18 shows the exploded view of FIG. 17 assembled.

FIG. 17 shows the assembled motor 92 relative to motor mount and umbilical cable connector 80 (e.g., a "Lemo" connector) with associated various electrical cartridges for the downstream electrical harness which include those forming the block of electrical components 139 used in the sensing and powering of the dispensers electrical components. FIG. 17 further shows motor mount 104 which supports motor 92 in stable fashion through fasteners 224 which extend along a common axis with the motor's driving shaft and into recesses 226 provided in the front face 228 of motor 92. This axial motor mount fastener connection also helps maintain a streamlined motor cover. Also associated with motor mount 104 are positioning pins 230 which face out to the opposite side of the motor mount contact surface of motor mount 104 for ready positing of transmission housing 49. On the same motor mount contact side, motor mount 104 includes connection extension 137 which extends from the lower end of the motor mount along a common axis of elongation as motor 92 just below (sufficient clearance of the placement of motor cover 60) and for less than the full extension length of motor 92. The free end of extension 137 includes capture ring 232 which receives and fixedly retains connector 80 to provide a stable connection point at the rear end of the hand-held dispenser. In addition, extension 137 has a recessed or apertured reception area 234 for receipt of at least part of electrical connection block 139 and connector 80 which aperture provides efficiencies in size minimization. FIG. 18 shows motor 92 mounted on motor mount 104 such that the gear 96 just clears front face 236 and has its fastener ring 215 and fasteners 214 received within upper front recess section 238 of mount 104. Lower front face recess section 240 of mount 104 is designed to receive the ball screw shaft portion 166 and locking nut 178 therein with wall hole 242 providing for added clearance to properly align first and second gears 96 and 98 as seen from FIG. 9.

Figure 19:
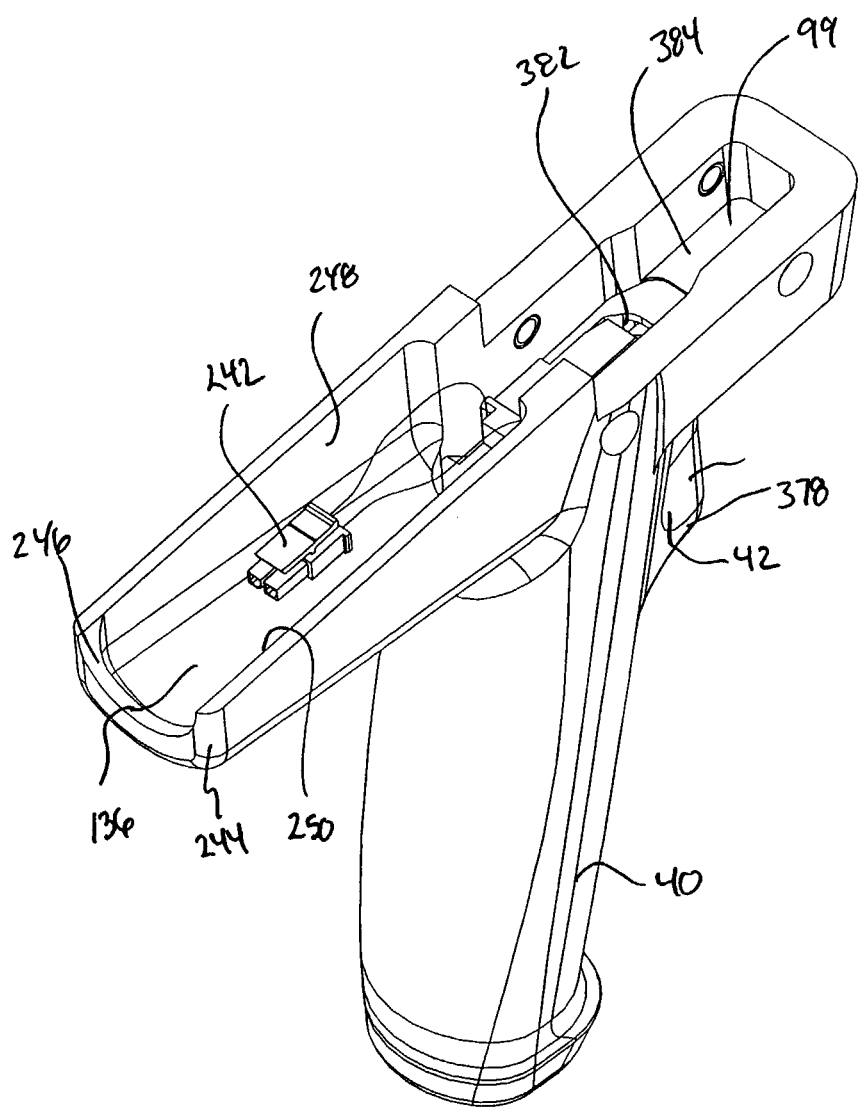
FIG. 19 shows a top perspective view of the grasp handle.

FIG. 19 illustrates grasp handle 40 with reception recess 136 in its rear end 244 and into which connection extension 137 and electrical connector block 139 are received (the trigger electrical connection plug 242 being illustrated as received within recess 136). As seen from a comparison of FIGS. 5 and 19, connector 80 received by the matching curvature flange 246, and side walls 248 and 250 are designed to conform with the lower side walls of extension 137 received in recess 136. Also, the plug-in receptacle (e.g., "Lemo" connector) can be fixed in place by providing threads on an exterior surface of the connector and corresponding threads in the motor mount for threaded connection of the connector to the motor mount. Alternate fastening techniques as in mechanical snap fasteners, adhesive and/or key/lock attachments are also featured under the present invention.

Figure 20:
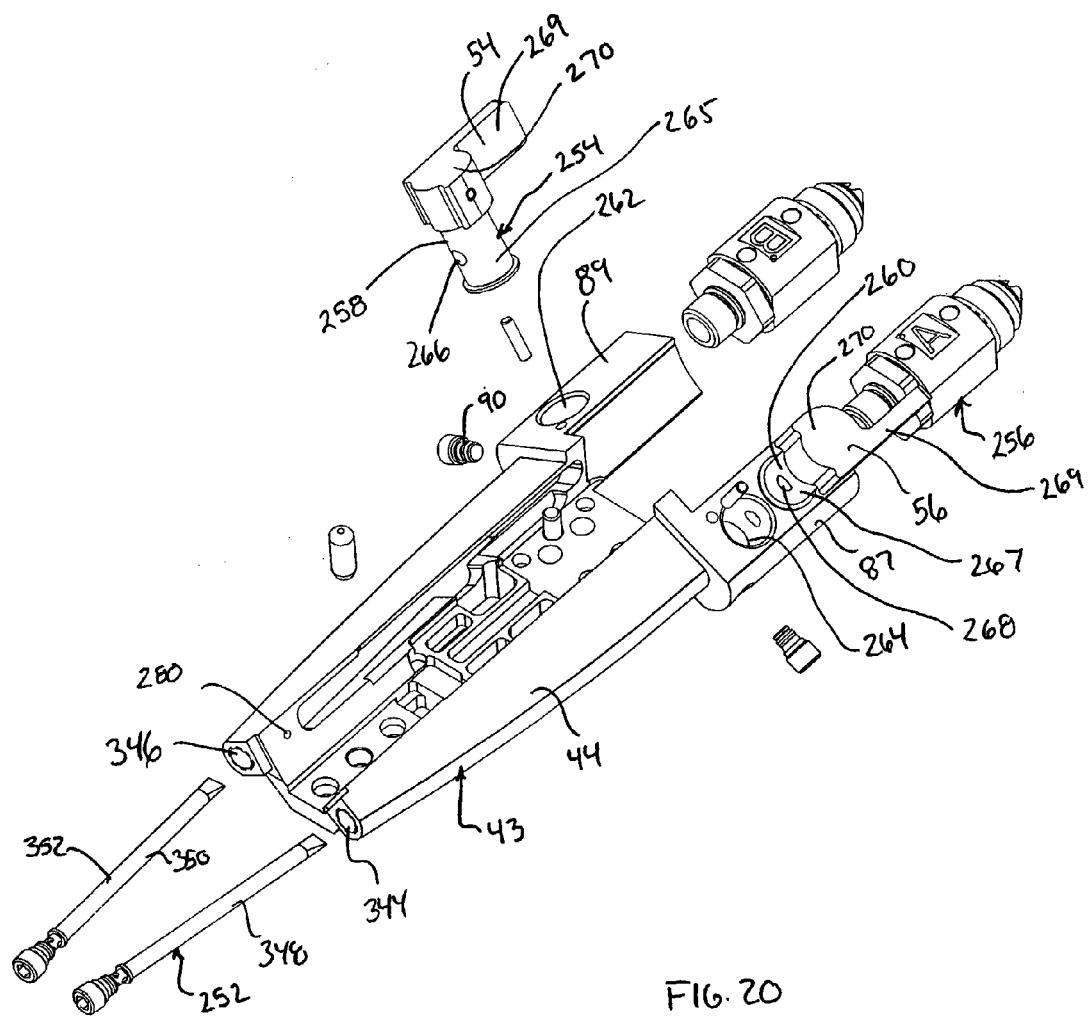
FIG. 20 shows an exploded view of the manifold assembly and swivel fittings.

FIG. 20 provides an exploded view of manifold assembly 43 with, port plug 90, filtering means 252, valving means 254 and chemical hose connection means 256 shown together with manifold (main body) 44. As shown in FIG. 20, valving means 254 comprises first and second valve assemblies 258 and 260 with respective valve handles 54, 56 and which are, in a preferred embodiment, spool valves, (although other valve assemblies are also featured as valving means as in biased sliding plug valves (manually or electronically activated), pinch conduit valves, shutter valves, ball valves, etc. or other manually or automated flow passageway shut off valves).

Figure 28:
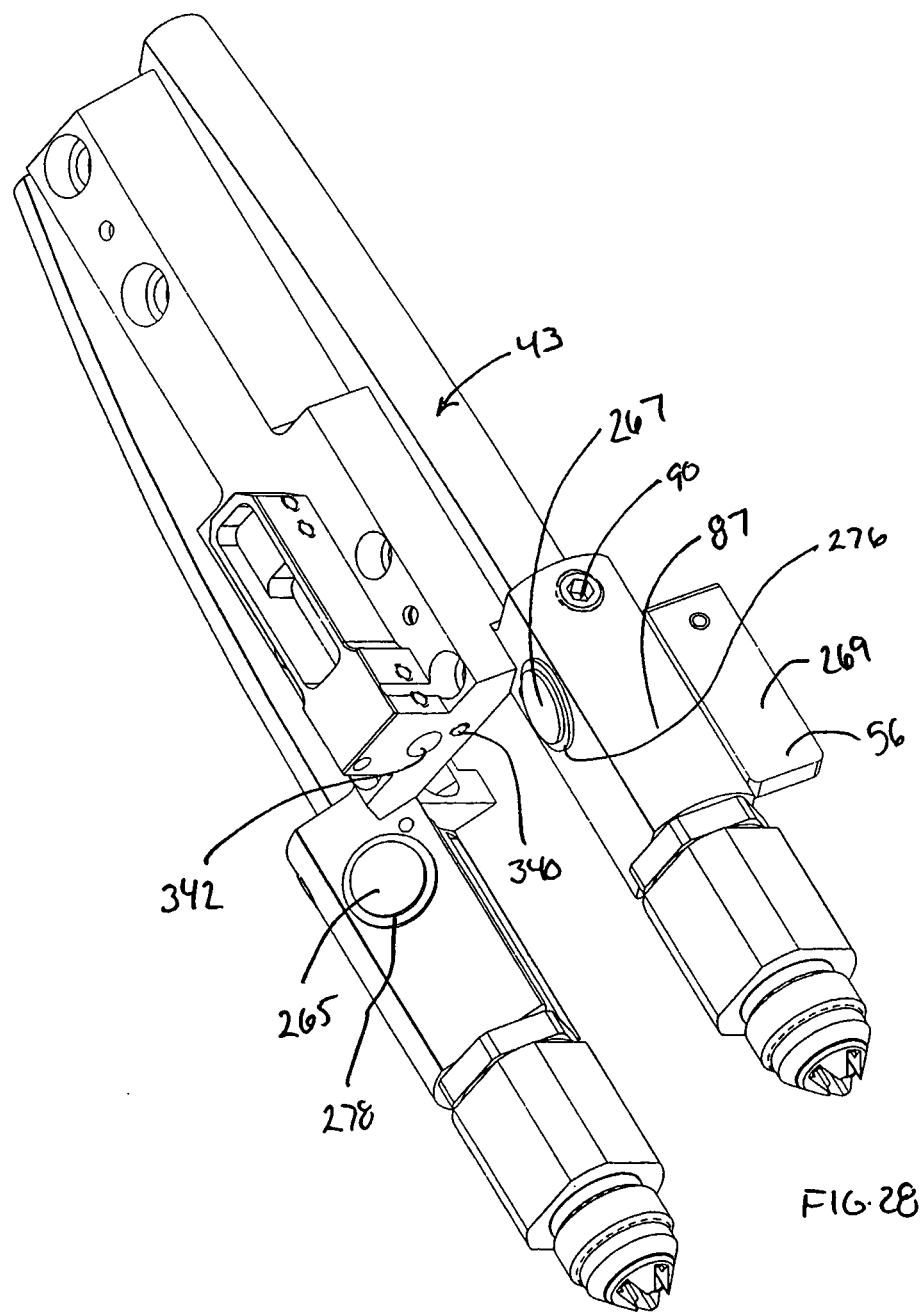
FIG. 28 shows a lower perspective view of the manifold assembly with swivel fittings.

Each valve assembly is received within a valve recess 262, 264 provided in respective extensions 87 and 89. As seen, spool body 265 has a spool valve 258 that has a passageway 266, while its opposite line counterpart 260 has its spool body 267 also provided with flow through passageway 268. The L-shaped 54, 56 handles and respective spool passageways (266, 268) are arranged to have the long leg 269 of the handles 54, 56 extend in line with the axis of elongation of extensions 87, 89 as shown if FIGS. 3A and 6, with FIG. 3A also illustrating the rounded short leg 270 having a first abutment recess wall 272 for contact with a respective one of stop pins 274 received by extensions 87, 89 and a second recess abutment wall 276 shown as falling essentially along the axis of elongation of the long legs 269 of the shut off handles. Thus, as seen from FIG. 3A rotation of the valve assembly 258 counter-clockwise will result in flow stoppage and will be readily evident as the long leg of handle 269 is moved from its aligned streamlined positioned to a shut-off flow, non-aligned position (e.g., preferably an essentially transverse relationship with the opposite stop wall 276 being along a common plane and providing a rotation out stop point relative to stop point 274). Handle 56 is turned clockwise to achieve a similar outward extension of long leg flow stop position. The friction level (e.g., closely toleranced manufacture preferably with the use of seal rings (not shown) provides for maintenance of the designed flow on or flow off position, although an added safety stop can also be provided as in a spring biased stop member supported on the extension 87, 89 for contact with a recessed portion of the shut off valves (not shown). FIG. 28 provides an underside view of manifold assembly 43 including the undersides of spool bodies 265, 267 with flanged ends being in contact with seal washers 276, 278 (a clamping arrangement relative to wing extensions 87, 89 being possibly by providing a two part spool and shut off handle combination). When the valves 258, 260 are in their streamlined position, chemical flow is free to flow of the outlet ports 280, 282 (FIG. 12) in the walls 65 and 67 of manifold 44 which are arranged for fluid communication with the chemical inlet ports of mixing module 46.

Figure 21:
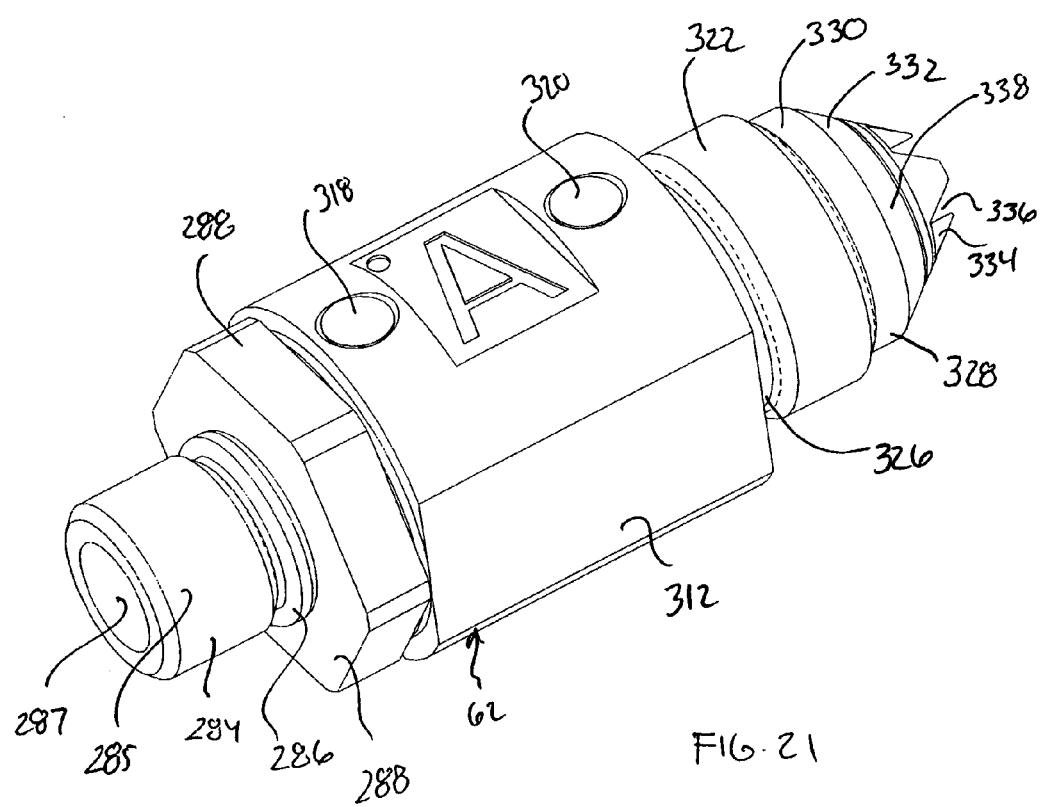
FIG. 21 shows a swivel fitting alone.
Figure 22:
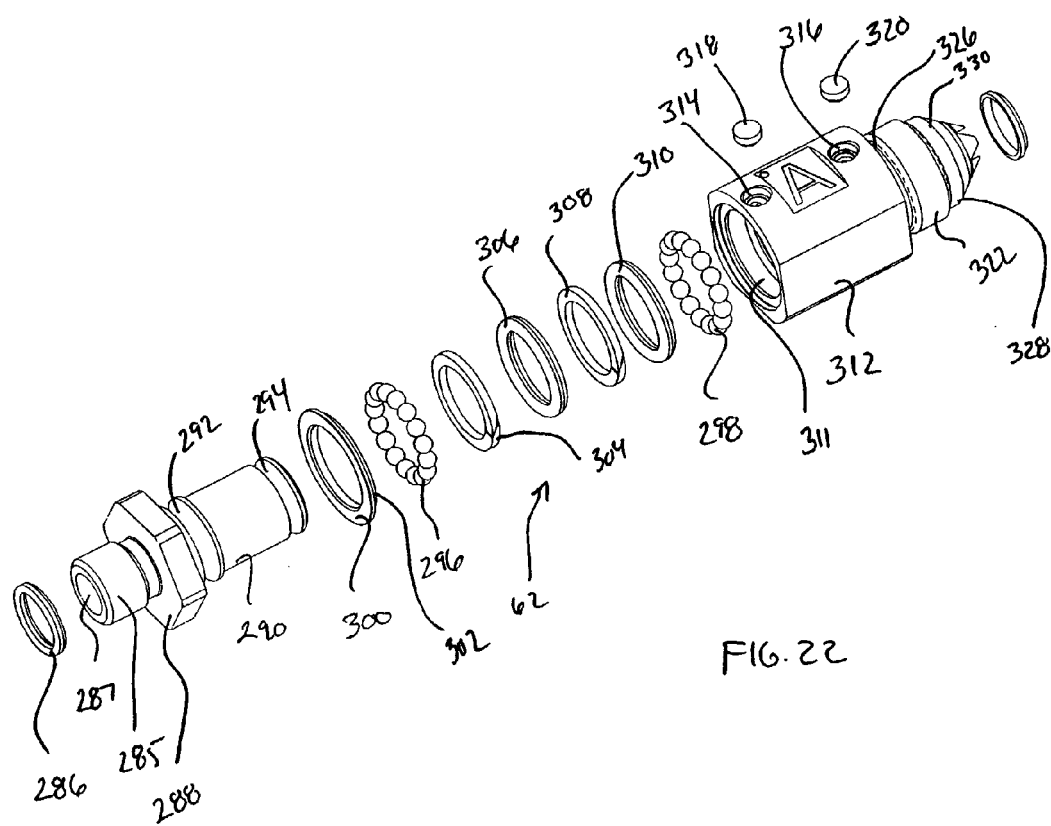
FIG. 22 shows an exploded view of a swivel fitting.
Figure 23:
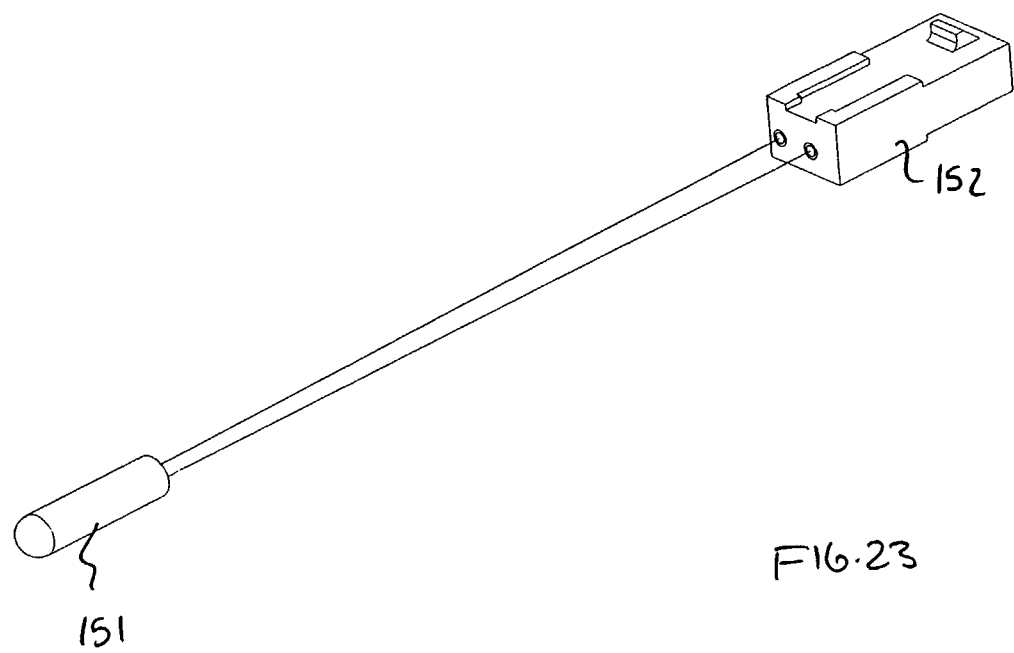
FIG. 23 shows a thermistor with electrical connector.
Figure 24:
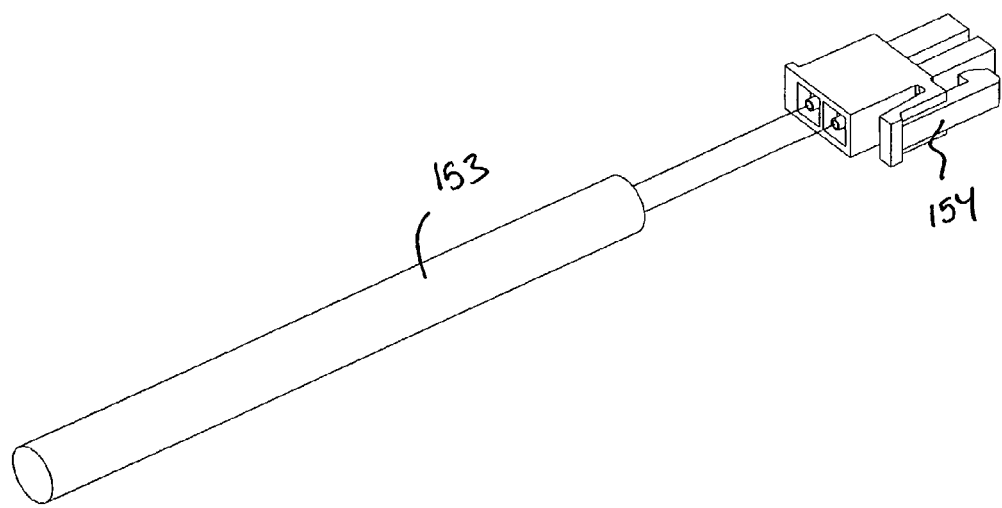
FIG. 24 shows a heater cartridge with electrical connector.

FIGS. 21 and 22 illustrate in greater detail chemical hose fitting 62 which in a preferred embodiment is a swivel fitting to help avoid twisting of the chemical hose line during usage. As each of swivel fittings 62, 64 is preferably the same (except for the illustrated chemical line "A" and "B" demarcation e.g., molded imprint) only one is described below. As seen from FIGS. 21 and 22, swivel fitting 62 comprises a hollow shaft way of a threaded hollow stub shaft with interior chemical flow passageway 287 end for threaded engagement with a threaded aperture provided at the free rear end of a manifold extension 87 having a central axis coincident with the central axis of elongation of extension 87. The base of insert 284 is recessed and receives seal ring 286. There is further provided locking nut 208 which is threadably received on intermediate region of shaft 284 for fixing the threaded connection of the threaded forward end of shaft 284 with wing extension 87. Rearward of locking nut 288 is hollow shaft body section 290 of shaft 284 with first and second bearing grooves 292, 294 axially spaced to opposite end regions of shaft body section 290 for receipt of first and second ball bearing rings 296 and 298. Adjacent and forward of bearing ring 296 is provided sealing front cage bearing contact ring 300 having a concave rotation surface for bearings in ring 296 which are placed in contact with surface 302 and held rearward by lock washer 304 and rearward space seal ring 306. Rearward of ring 306 is positioned second lock washer 308, followed by forward seal ring 310, then second bearing ring 298 which is received in a corresponding recess 311 within bearing housing 312 of swivel fitting 62. Housing 312 is provided with radial openings 314, 316 with corresponding plugs 318, 320 which for lubricating bearing rings 296 and 298.

As seen from FIGS. 2, 3 and 22 heated chemical hoses 28 and 30 are connected by threaded connection via connection device 322 (preferably an exterior threaded ring portion) or some other connection means (clamp assembly, adhesive or some other connector means for securing the end of the hose to the swivel fitting). As further seen form FIG. 22, the hollow extension 326 extending rearwardly out from housing 312 has the threaded connection ring 322 forward of a smaller diameter castellated extension 328 having castellation base 330 and a conical (converging towards central axis) section that leads rearward and at its free end which has one or more teeth or castellation forming members separated by slotting 336. Teeth members 334 (e.g., preferably 4 to 8 in number) also are preferably conical in configuration with a flat edge free end as shown in FIG. 21. This castellation connection provides for the insertion tip of the hose heater wires received in hoses 28, 30 to maintain a desired temperature and avoid cold shot due to non-heated lengths of chemical feed, without fear of blocking off the chemical inlet opening or swivel fittings 62 and 64. That is, the free end of the inserted heater hoses are often provided with bulbous or smooth surface tips to facilitate the threading of the heaters into hoses 28 and 30 which often have non-smooth interior walls. The bulbous tips are precluded from blocking flow as even if they are pushed into contact with the castellated ends of the swivel fittings there is still provided a passageway around the tip and through the spaces 336 between the teeth member 334. Thus, as seen from FIGS. 21 and 22, swivel fitting includes internal axially spaced apart roller bearing sets with an intermediate axially spaced apart pair of o-ring seals. At the rear end is provided means for connection to the feed end of a chemical A or B conduit (e.g., castellation or pointed, sloped turret configuration with opening). The opposite end is designed for manifold insertion and also features a base seal and chemical outlet for feeding into the manifold chemical passageway extending along the manifold 69, 71 and subject to temperature control by the aforementioned heater cartridge. FIG. 22 also illustrates seal ring 338 provided along the non-toothed section of conical extension 332 (and is preferably conical in shape as well) which helps avoid leavage at the hose connection/swivel fitting interface.

With reference to FIGS. 12, 23, 24 and 28 there is partially illustrated manifold sensed heating system comprising thermistor 151 with its electrical plug in receptor 152 (preferably received by one of the components of block 139 harnessed to connector 80 and the umbilical cable 29 extending to the base unit). Thermistor 151 preferably includes a sensing element potted within a closed end (e.g., stainless steel) tube which is inserted into an elongated reception cavity 340 formed at the rear end of manifold 44 as shown in FIG. 28. As also shown in FIG. 28 extending alongside (e.g., parallel axis of elongation) is the heater reception cavity 342 for receiving cartridge heater 153 (FIG. 12). Cartridge heater 153 preferably comprises resistance heater which is in electrical communication with electrical source connector 154 which is placed in communication with the harness linked to connector 80 and, in turn, umbilical cable 29. Cartridge 153 is relatively long (e.g., occupying over 30% and more preferably 50 to 75% of the manifold curved outer edge passageway 69, 71 extended forward of border wall 51 or 20% to 60% of the total passageway length from swivel fitting inlet to the chemical outlet port as in 282 (e.g., 2 to 5 inches as in 2.5±0.5). Manifold heater 153 is also preferably rated at 150 watts at 24 volts to provide the desired rapid and sufficiently high temperature range level used to avoid any cold shot or below desired temperature chemical mix being received in the mixing module. Thus, sensor 151 monitors the level of temperature of the manifold casing at a location adjacent the chemical passageway extending within manifold 44 and the cartridge heater 153 extends adjacent the thermistor (e.g., note the preferred central location (widthwise) for heating up both chemical passageways leading to the two chemical inlet ports in the mixing module and is preferably placed in the upper half region of male extension member 94 of manifold 44 and/or in the main body of manifold from which male extension member 94 extends). Thus, with the sensed temperature feed received from thermistor along umbilical cable 29 to a logic board relay in base unit 26 (also preferably in communication with control panel 26 settings) and the electrical power feed communication with heater 153 the heater can be rapidly and accurately set to a desired temperature which provides the desired temperature to the chemical being fed through manifold 44.

Table II summarizes some differences between representative prior art manifold heater designs for dispensers found in the field (e.g., Sealed Air 800 and 900 series dispensers) and a preferred hand held dispenser system of an embodiment of the present invention.

TABLE II

|  | Preferred Embodiments of Invention | Representative Prior Art | Comments |
| --- | --- | --- | --- |
| Means of Sensing Manifold Temperature | Thermistor | None | Preferred present invention embodiment has a sensing thermistor that is accurate to within 1 degree Fahrenheit - as compared, for example, to an open loop system with no means of monitoring or controlling temperature found in the prior art |
| Means of Controlling Manifold Temperature | Temperature Control Circuit preferably based on Thermistor Feedback | None |  |
| Accuracy of Manifold Temperature Control | Preferably plus or minus 1 or 2 degrees Fahrenheit | No means of control | Prior arts manifold temperature is hard to predict, and is highly dependent on ambient conditions, because there is no means of control |
| Heater Power | Greater than 50 Watts as in 100 to 200 Watts with 130 to 150 Watts being preferred | 15 Watts | Prior arts underpowered heater results in protracted warm-up times and is normally unable to achieve proper operating temperature - even after prolonged warm-up times |
| Typical Manifold Operating Temperature | Greater than 115° F. with 120 to 150° F. being illustrated and 130° F. being preferred | 100 to 115° F. | A preferred embodiment of the present invention has a manifold heater that will maintain the temperature of the manifold at the same temperature setpoint as in the chemical lines - thus helping to eliminate the cold shot phenomenon |
| Typical Warm-up Time | 2 minutes | Fails to achieve ideal operating temperature - will max out after 20 minutes at a suboptimal temperature | Preferred embodiment of the present invention features a manifold that warms up quickly because of provided high power and precise control circuitry (within 2 minutes, for example). |
| Cold Shot | Provides for no appreciable cold shot effect after warm-up period is concluded | Helps to reduce the cold-shot, but does not eliminate it | Even minor cold-shot problems can degrade resultant outputs. |

With reference to FIGS. 20, 25, 26 and 27 there is provided a description of a preferred filtering means 252 within the hand-held dispenser. FIG. 20 illustrates fitter reception ports 344, 346 through which are inserted the straw-shaped, elongated filter assemblies 348, 350 (e.g., cartridge type in-line fillers available such as cellulose, plastic or stainless steel mesh fillers having sizes 0.0025 to 0.01 inch mesh openings as in 0.005 to 0.0075 mesh openings and with a filter body diameter of less than ½ inch (e.g., ⅛ to ⅜ inch as in a ¼ inch filter body diameter) and a length of 2 or more inches, for example, 2 to 6 inches being preferred with a ±0.5 filter body cartridge with ¼ inch diameter being illustrative.

FIG. 20 thus shows an exploded view of the manifold assembly 43 including the tubular filter assemblies 248, 250 that slide within the elongated cavities provided in the manifold wings that extend downstream from the manifold casings which receive in transverse fashion the rotatably on/off line valves and axially the swivel fittings for connection to heated chemical hoses 28, 30.

As seen, the enlarged tubular filters 348, 350 extend for a significant portion of the elongated length of the manifold. For example, FIG. 3A illustrates some illustrative (not intended to be limiting) size dimensions in inches for the gun dispenser and particularly the streamlined manifold 44. For example, the streamlined left and right extensions 69 and 71 of the manifold represent the exterior sides of the solid portion of the manifold or the portion having widthwise completion by either a solid body or interconnecting member represented by rear portion 53 (e.g., a truss arrangement) which also provides for mixing module mounting. This length is also generally equal to the chemical passage length extending to the two outlets on the tapered walls of the manifold. A preferred usable filter length is preferably 20% or more of extension 69, 71 extending from the forward end of the valve casing to the free end tip of the dispenser (or chemical line extension in the manifold), more preferably 30% or more, with about 45%±5% being illustrative. The tubular filters are preferably a "304" stainless steel standard grade woven wire cloth with a 2.41 inch usable filter length. Tubular filters with, for example, 0.174 outside diameter×0.156 inside diameter inch with a 100×100 mesh, 30.3% open area and a 0.0055 inch opening width are preferred.

Also, with reference to FIG. 3A, the above noted "solid" or mixing module support portion with extensions 69, 71, has an axial length which is greater than its width as in L/W of 1.5/1 to 3/1 ratio with about 2/1 preferred.

Figure 27:
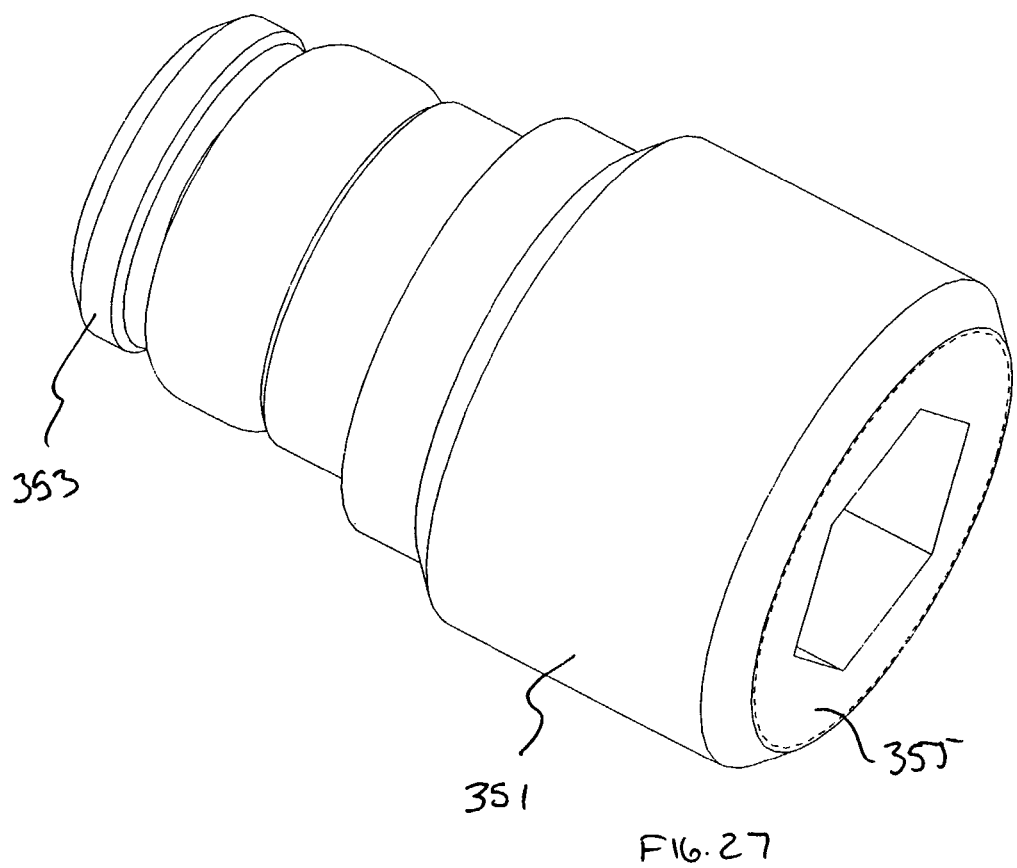
FIG. 27 shows an access port plug.

FIG. 27 shows a close up of one of the port plugs 351 that provide means for sealing the side clean up ports 90 of the manifold and are preferably threaded as at ring 353 and have an enlarged engagement head 355 (allen socket head) preferably with a high friction (multiple elastomeric seal rings).

Figure 25:
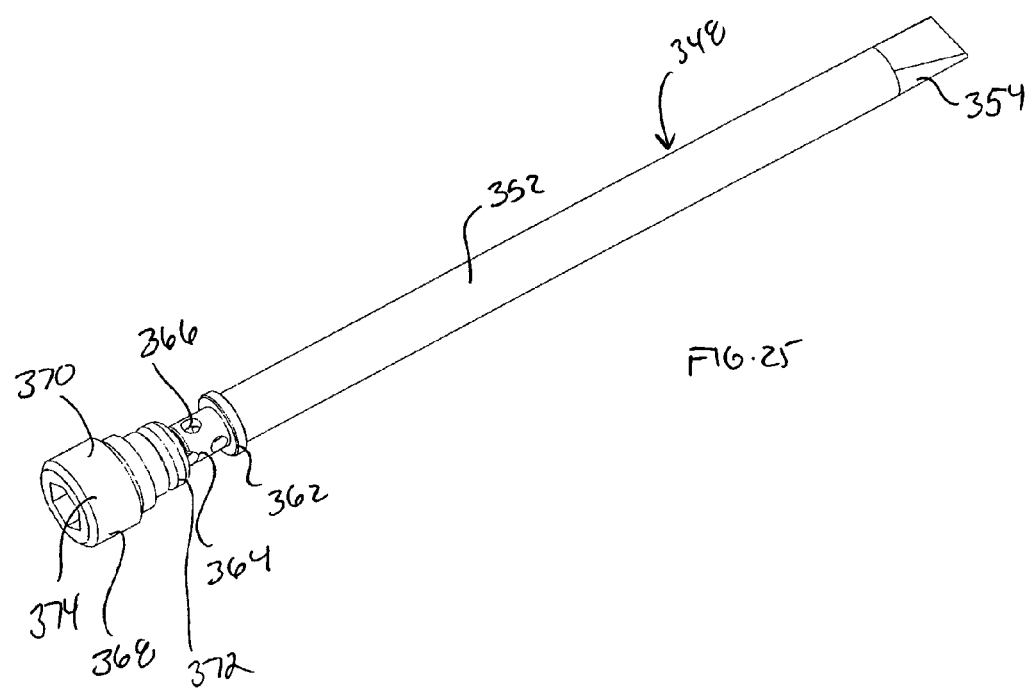
FIG. 25 shows a filter assembly.
Figure 26:
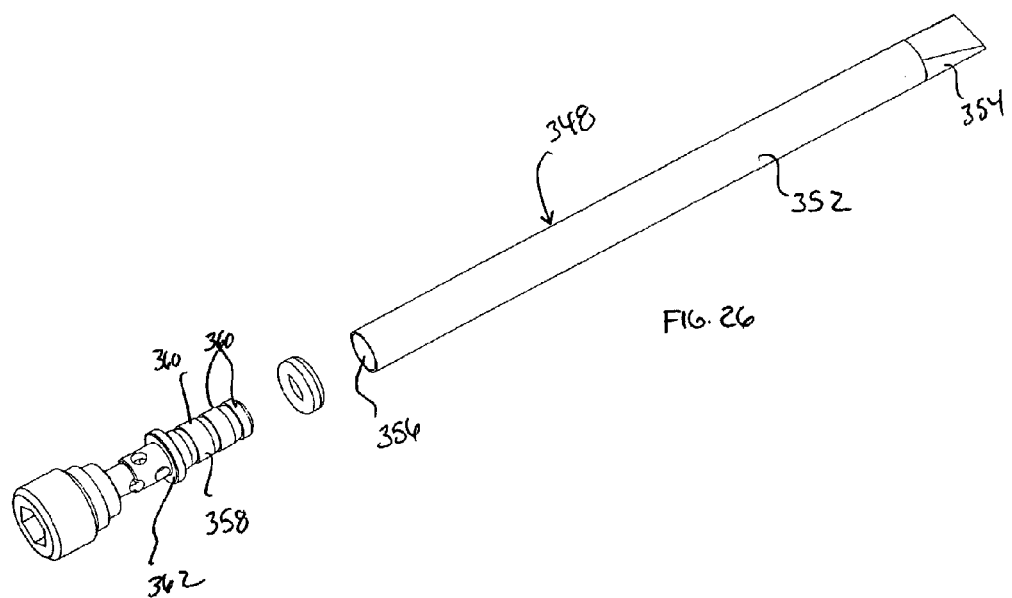
FIG. 26 shows an exploded view of the filter assembly.

FIGS. 25 and 26 show a perspective view and exploded view of the filter assembly associated with the manifold assembly described above which includes an elongated filter body 352 (each being the same preferably so only one is described) with tapered closed off upstream end and a fluid communication and plug engagement plug end (e.g., a male fitting attachment component having spaced apart enlarged surface areas separated by grooves). The male fittings are provided at the rear end of an insert member that is preferably threadably received by threaded apertures provided at the forward most end of the manifold housing and has a tool engagement head as in an allen wrench socket. This insert member further includes outlet ports designated to feed the chemical outlet ports positioned for feeding the mixing module and an annular seal thereabout. The filter (screen) material used is designed to be sufficiently porous to avoid undesirable levels of pressure back up, but one having small enough porosity to avoid particle contamination downstream as in chemical port blockage at the mixing module chemical ports. The filters are preferably designed to provide a filtering surface area of more than five times greater than that of the illustrative prior art herein with even greater potential for expansion as in are ten times either with single wall tubular filters or ones having labyrinth interiors. With reference to the preferred embodiment shown in exploded view in FIG. 26 the filter assembly has an open end 356 (downstream from end 354 relative to the flow direction) which received filter plug insert 358 having raised (preferably compressible/elastomeric material) rings(s) 360 designed to contact the interior surface of filter main body 352 to preclude inadvertent chemical release.

Plug insert 358 further comprises stop ring 362 which abuts against the open end of main body 352 as shown in FIG. 25. Downstream of stop ring is the radial chemical flow outlet pipe section 364 having one or more (preferably circumferentially arranged to ensure feed to the mixing model inlet port) outlet holes 366 in the pipe section 364. At the downstream end of pipe section 364 there is provided the manifold engagement section 368 comprised of plug head 370 which also preferably has a threaded ring 372 for threaded engagement with filter reception ports 344 (346) at the forward end of manifold 44. An enlarged cap head (e.g., an allen wrench tool head) 374 is illustrative. Thus, filter assembly 348 can be readily inserted into the chemical flow passageways opening out at the forward end of manifold 44 and fixed in position sealing ring.

Figure 29:
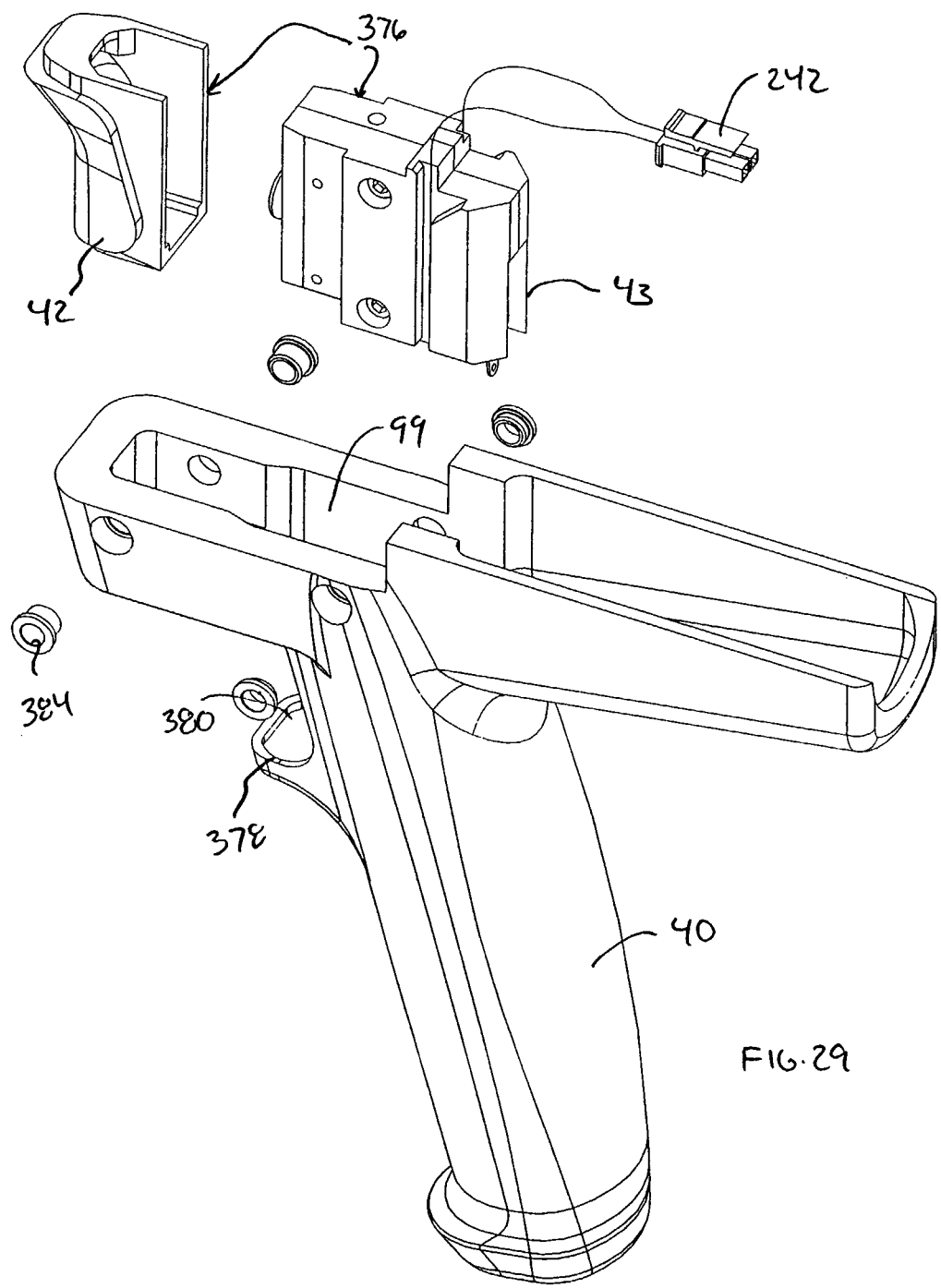
FIG. 29 shows an exploded view of the grasp handle and trigger assembly.
Figure 30:
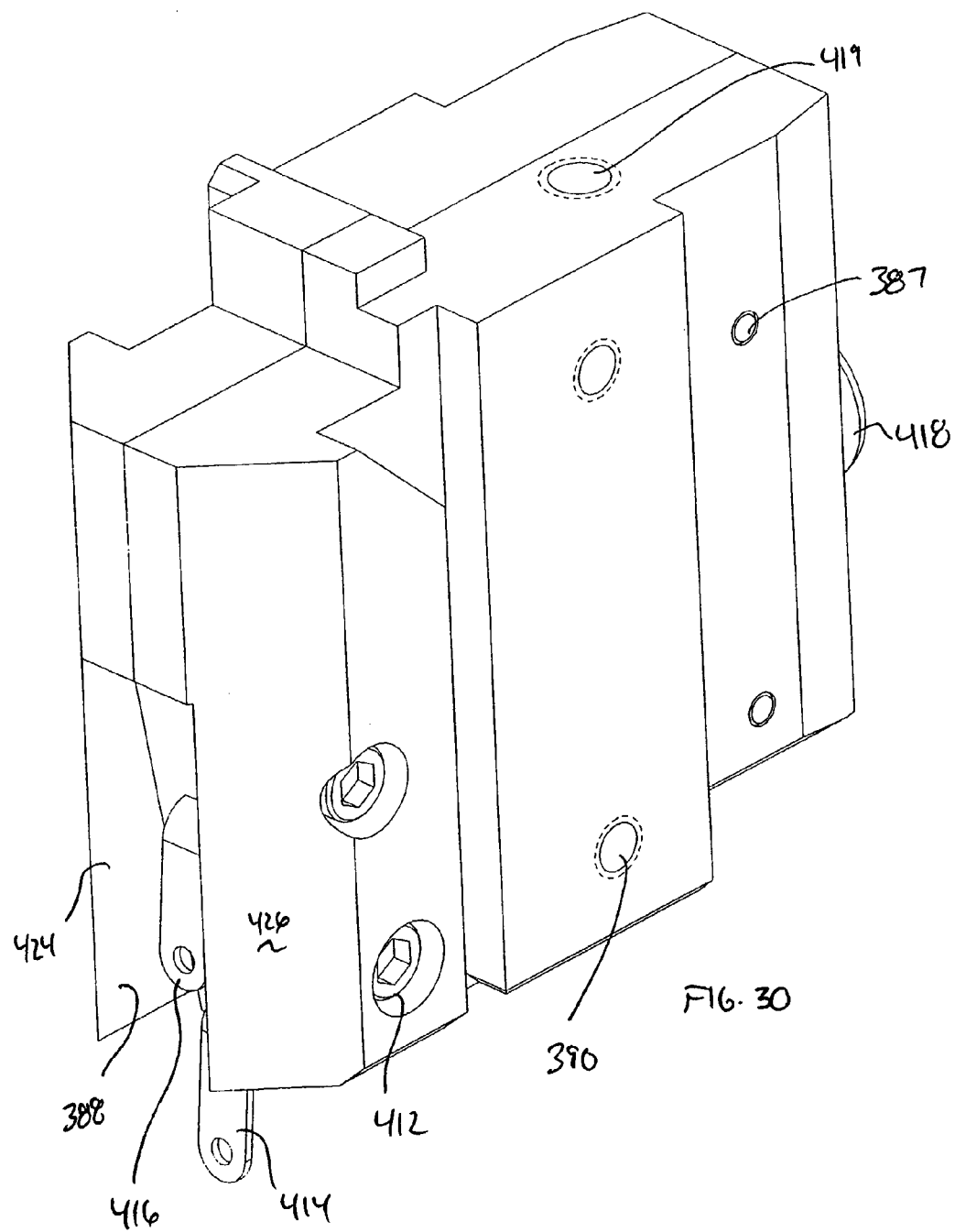
FIG. 30 shows a rear perspective view of the trigger assembly.
Figure 31:
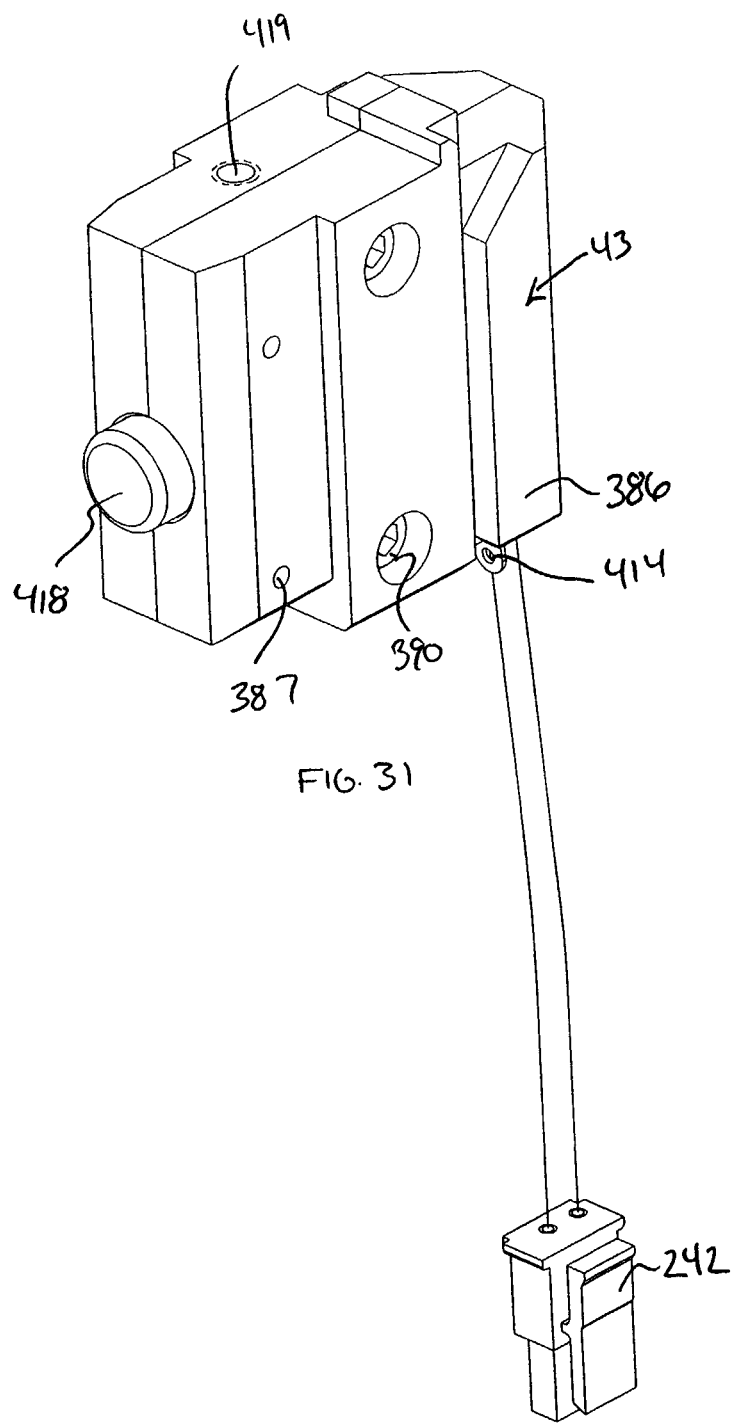
FIG. 31 shows a front perspective view of the trigger assembly with electrical connector.

With reference to FIGS. 19, 29, 30, 31, 32 there is provided a description of a preferred trigger assembly or dispensing activation means 376 comprising trigger hood 43 and trigger device 43. FIGS. 19 and 29 illustrate grasp handle 40 which is preferably a sturdy plastic molded member of, for example, Delrin™ plastic from DuPont. Grasp handle 40 preferably includes a trigger boot support 378 with front facing aperture 380 and an access passageway 382 formed in the floor region 384 of handle 40 defining front, top handle cavity 99. Boot 42 is thus readily inserted through access aperture 382 and retained in position (e.g., relative sizing or with additional securement means as in adhesive). Boot 42 is formed of a highly durable, flexible material as in SANOPRENE™ plastic.

Trigger device 43 is also readily placeable (and removal for replacement or servicing) through access aperture 382 and is placed behind boot 42. Threaded metal insert plugs 384 are provided for manifold securement as described above. Trigger device 43 is preferably made of two interconnected trigger switch module sections 386, 388 which are secured together with fasteners 390 and alignment pins or fasteners 387, 389. Module sections 386, 388 are preferably formed so as to be able to withstand significant impact and not deform as in aluminum cast components of relatively thick cross-section. Each of the module sections preferably includes a matching recess formations 392 (only one shown) which when coupled define a reception region for push button 394 or finger compression member (preferably a solid member) and associated biasing spring 396.

Figure 32:
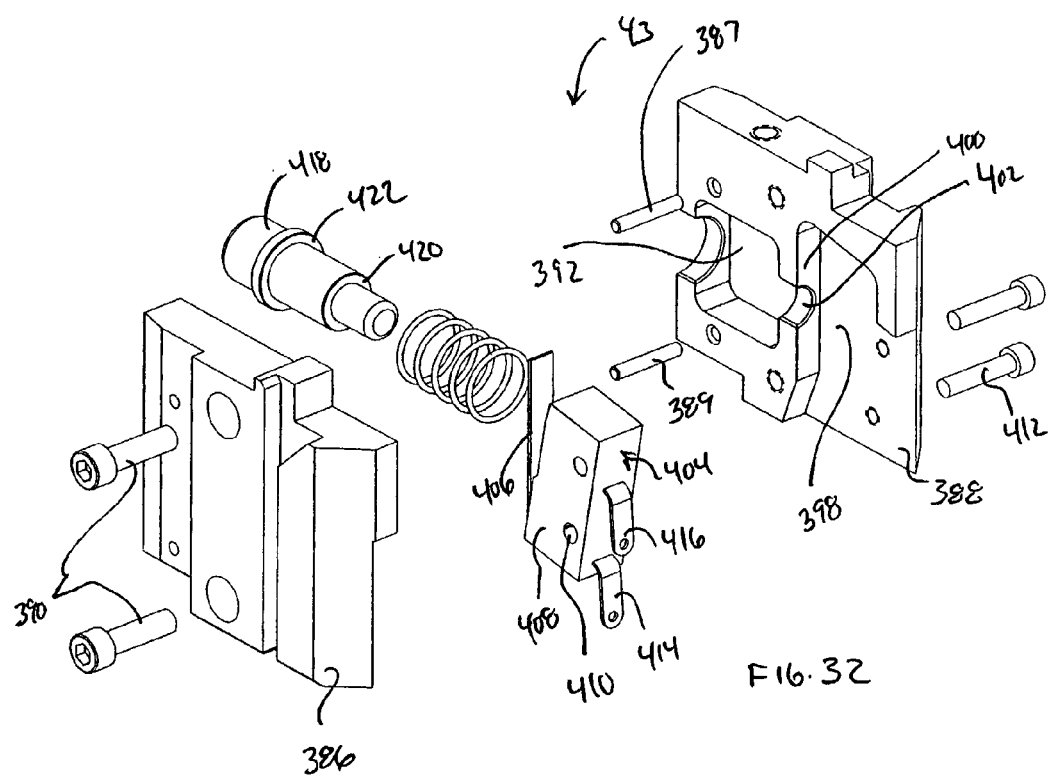
FIG. 32. shows an exploded view of the trigger assembly.
Figure 33:
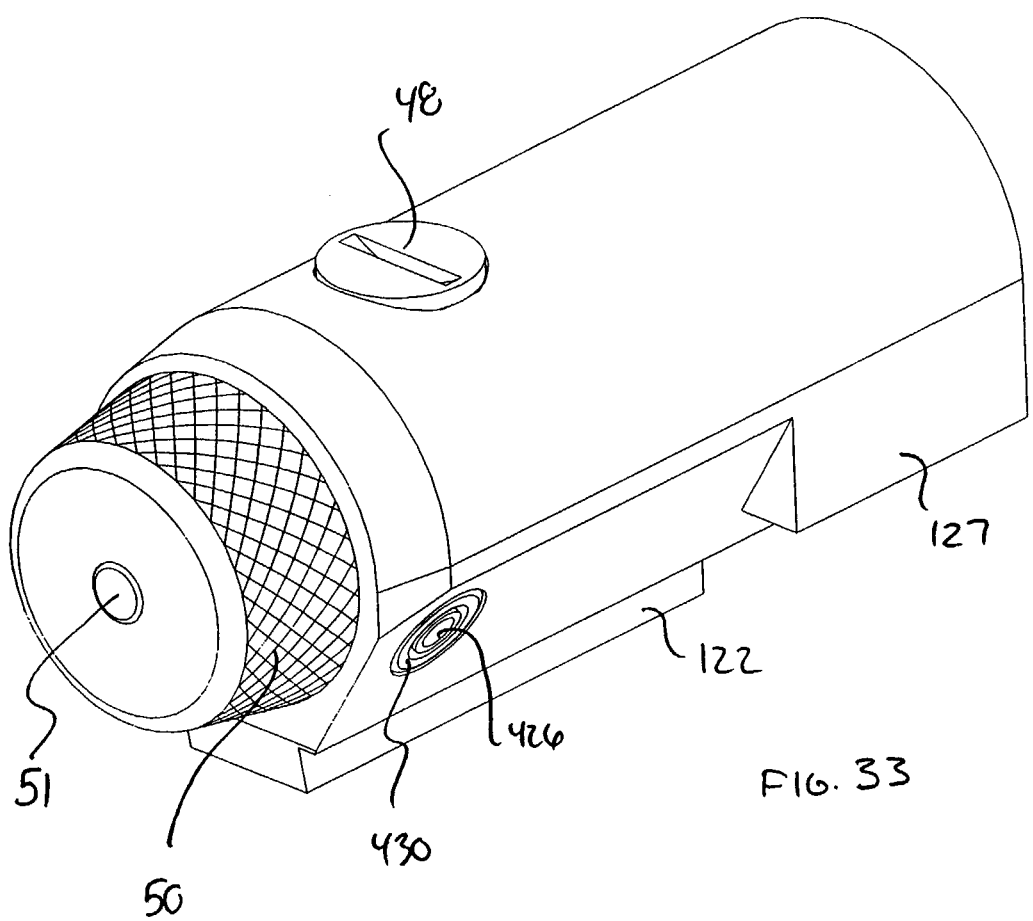
FIG. 33 shows the mixing module alone.

FIG. 32 also illustrates second cavity formations 398 (one of two shown) to the opposite side of blocking wall section 400 with push button pin reception hole 402 (each module section preferably providing a half section of hole 402) positioned within second cavity formation 398 is contact switch 404 which in the illustrated embodiment comprises a simple contact bar 406 with switch body 408 having positioning holes 410 for receipt of positioned screws 412 with the circuit lead 414 and 416 at the rear end which are wired to electric connection plug 242. Thus upon finger compression of boot 42 and underling push button contact end 418 with inward motion stop 420 hits against wall 400 (controls the level of contact and prevents undue compression force levels on the more delicate switch 404) and outward biased extension stop ring 422 is outwardly biased for a return function. Trigger device 43 itself can be secured in position relative to grasp handle 40 (in addition to the reception cavity friction contact reception within trigger support region 378 in the handle) via a threaded fastener extending into threaded hole 419 via a threaded fastener inserted through a hole in the recess floor of the grasp handle (not shown) which involves a tilting of the trigger device before rotating into its final resting position once access aperture 382 is cleared. A variety of other trigger switching means may also be relied upon with each type preferably combined with an added protective casing like that shown suited for that switch type to keep harsh impacts away from the more sensitive electrical components. In this regard as seen from FIG. 30 the rear wall flanges 424, 426 extend at to or past the leads 414, 416 to preclude undesirable compression contact on the leads and switch in general.

Thus, as trigger switches are one of the most unreliable components on previous hand-held dispenser designs, the trigger module shown in the figure is designed to survive all foreseeable impact loads, and for trouble free operation for the life of the system. By isolating the relatively fragile microswitch inside of the module, there is created a design that can survive reasonably harsh impact loads from any direction. The microswitch is isolated from impact and protected by the two switch housings (e.g., aluminum casings) and the plunger design. The illustrated (brass) plunger has an annular shoulder that limits the travel of the plunger to protect the switch from impact.

FIGS. 33-37 shows various views of mixing module 46 designed for releasable connection both to the chemical feeding manifold 44 such that each of its chemical inlet ports 426, 428 each having a mixing module supported o-ring 430 (only one of the two module chemical inlet ports with associated o-ring seal is shown in Figure at the lower front end) as well as the drive train for reciprocating the valve rod having its forward most end just protruding out from the hardened dispenser tip cap. Reference is made to U.S. patent application Ser. No. 10/623,716 filed Jul. 22, 2003 and PCT Publication No. PCT/US2004/14420 directed at a mixing module design sharing some similarities with the mixing module shown above, and which applications are incorporated herein by reference. FIGS. 33-37 further show the mixing module having a lower projection block 122 for secure fastening with the manifold and/or handle housing (manifold in the illustrated preferred embodiment). FIG. 48 additionally illustrates releasing solvent access cap 48 at the module housings top intermediate region together with associated seal ring.

Figure 34:
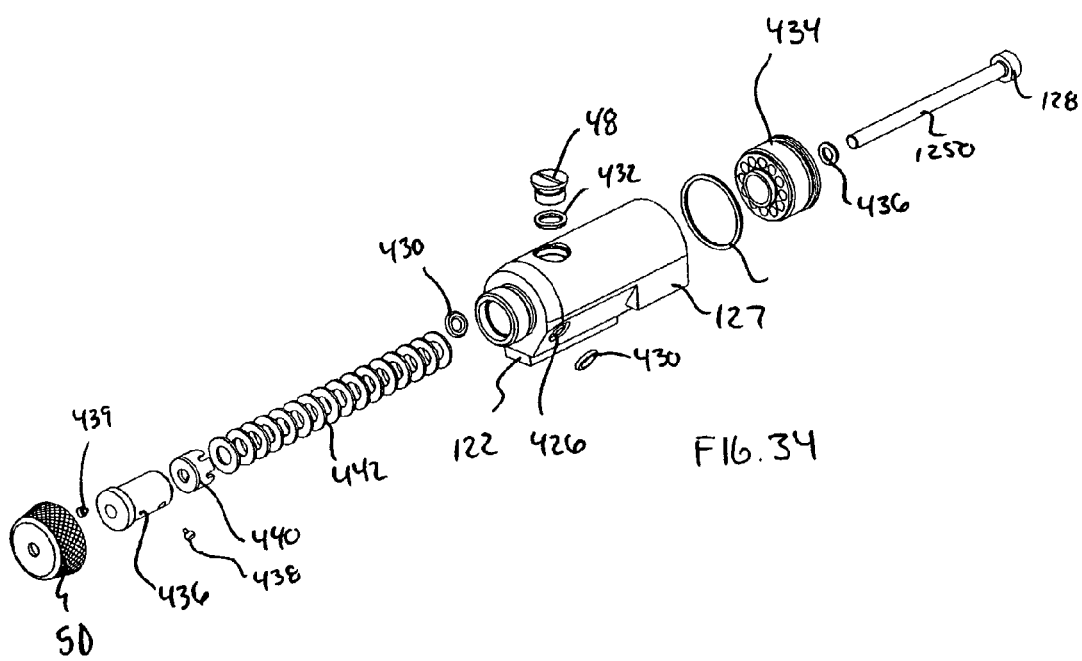
FIG. 34 shows an exploded view of the mixing module.

FIG. 34 shows an exploded view of the mixing module 46 including in front to rear axial order, the hardened tip cap 50, the Teflon mixing chamber 436 (with associated metal chemical inlet ports 438, 439), the spacer sleeve with solvent access openings, the compression means 442 (e.g., the stack of Bellville washers shown) the mixing module housing, seal ring 444, the threaded back cap 434.

Figure 35:
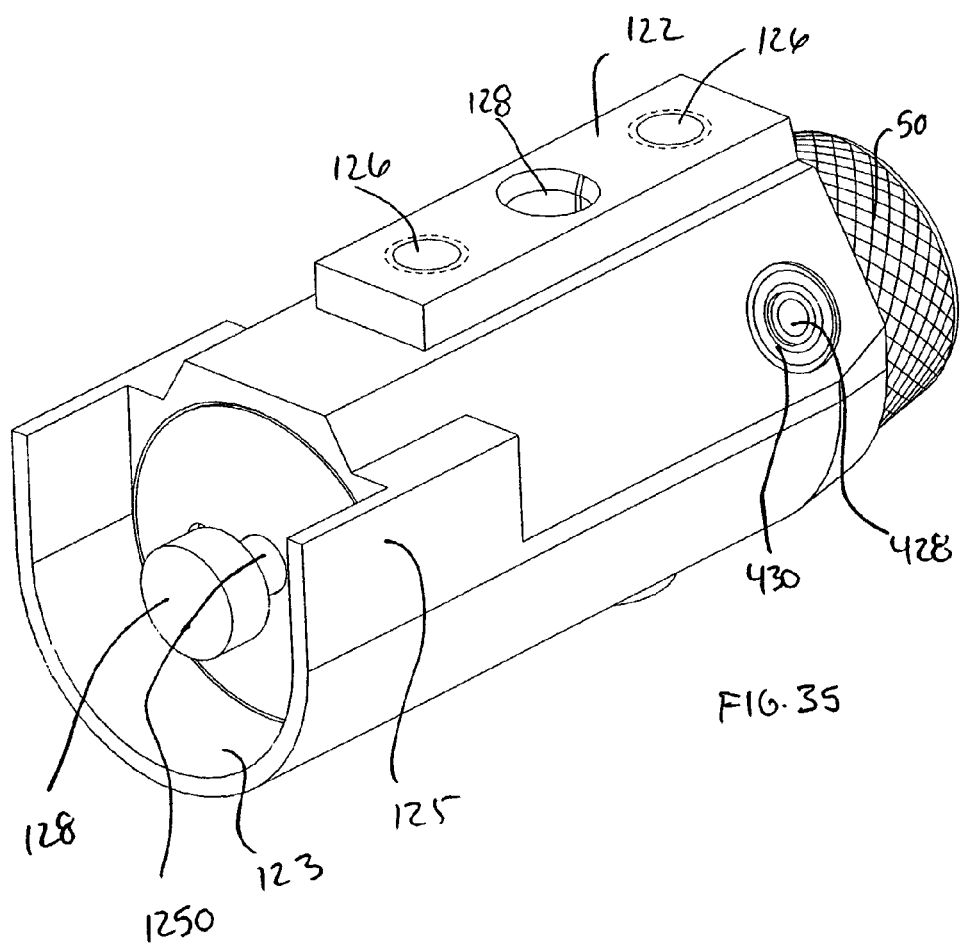
FIG. 35 shows an underside view of the mixing module.

FIG. 35 shows an underside perspective view of the mixing module 46 showing the opposite in feed chemical port 428 and also the open bottom housing flange or cowling 123 having a (legs extending down when properly oriented) a U-shaped cross-section surrounding the enlarged capture end 128 of the valve rod 1250 which extends through the threaded back cap 434 (FIG. 34) with associated O-ring 436 in sliding fashion relative to the smaller diameter portion of the valve rod.

Figure 36:
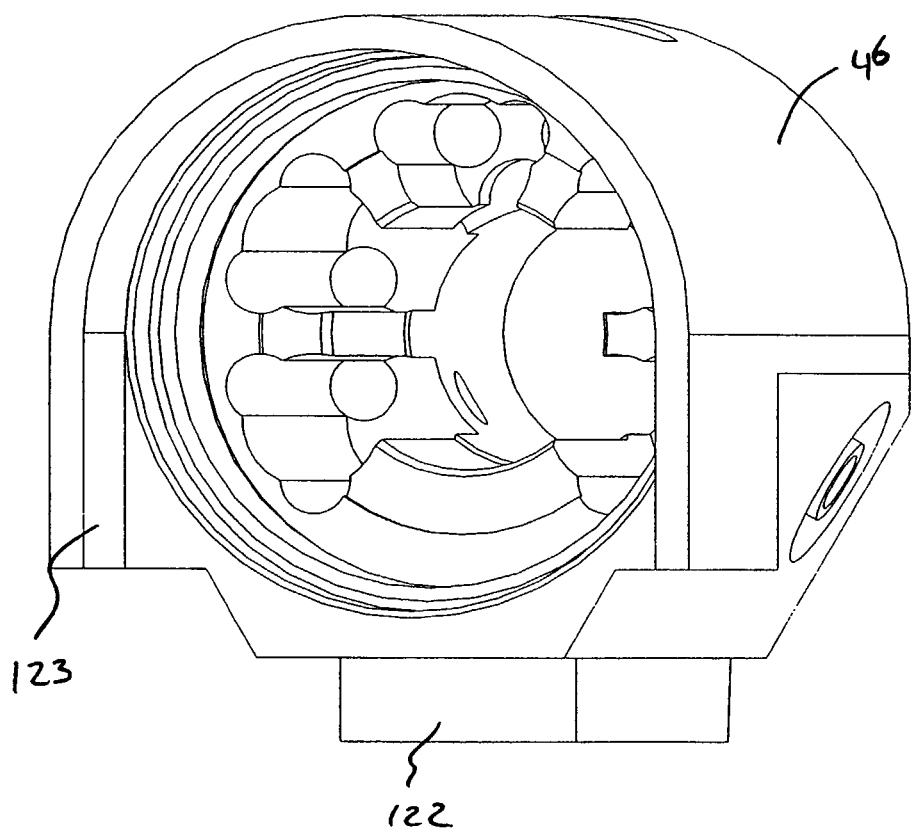
FIG. 36 shows an interview view of the mixing module.

FIG. 36 shows in cut away fashion the mixing module housing including its lower mounting block 122 for reception of fasteners (e.g., two preferably extending through or from the manifold and preferably an added position screw or pin recess (or vice versa)).

Figure 37:
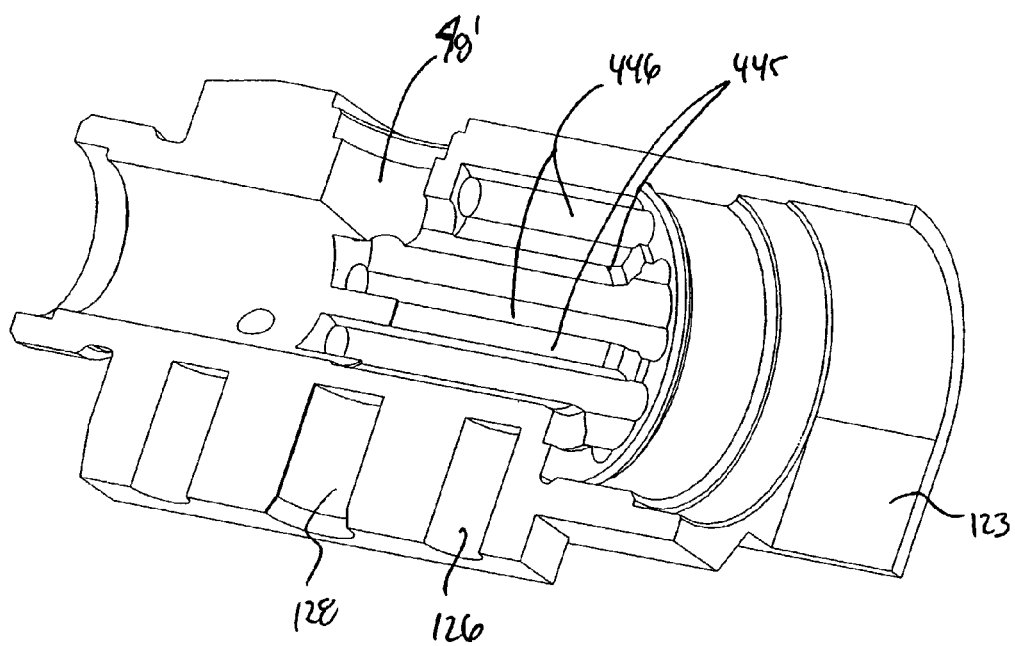
FIG. 37 shows a cross-sectional view of the mixing module housing.

FIG. 37 shows the interior of the mixing module housing 46 from a rear to front end perspective. By way of the axial semi-grooves or serrations (cavities) 446 found in the side wall of the mixing housing, the housing for the mixing module is extensively modified (machined) to increase its internal volume, to increase its solvent capacity by about five times compared to previous designs. FIG. 37 also illustrates solvent access port 78' through which solvent can be added periodically manually or as part of an automatic solvent feed system as from a solvent supply container such as one stored in base unit 16 and fed via a conduit extending together with umbilical cable 29. These solvent volume expansion cavities 446 are thus devoid of any other material other than solvent during usage with their (preferably semi-cylindrical and elongated) interior separators 445 providing the positioning contact surfaces for the interior components shown in FIG. 34. In addition, the U-shaped, rear cover or hood 123 feature has been added to the rear section of the housing, for added protection against chemical contamination. In addition, this semi-circular hood at the back end of the housing is designed to protect the area around the puller that mates with the end of the valving rod, from foam, solvent, and chemical contamination.

The present invention is also directed at assembling the above described dispenser and dispenser systems and subsystems and using the dispenser for dispenser usages as in protective packaging material dispensing (works well with adhesive type materials that can bind up products).

What is claimed is:

1. A hand held dispenser, comprising:
   a handle;
   a dispense material manifold supported by said handle;
   a dispense material mixing module supported at a forward, dispensing end of said manifold, said mixing module having a dispense material passageway that opens out to a dispenser outlet;
   a driver supported by said handle;
   a reciprocating member in driving communication with said driver and positioned for reciprocation in said mixing module;
   a drive train system positioned so as to convey drive from said driver to said reciprocating member;
   a first valve assembly and a first valve housing receiving said first valve assembly, and said first valve housing extending rearwardly off of a first side of a main body portion of said manifold such that said first valve housing is rearward of a rearward end of said mixing module;
   a first dispense material hose fitting in dispense material communication with said first valve housing;
   a second valve assembly and a second valve housing receiving said second valve assembly, and said second valve housing extending rearwardly off of a second side of the main body portion of said manifold such that said second valve housing is rearward of a rearward end of said mixing module; and
   a second dispense material hose fitting in dispense material communication with said second valve housing; wherein
   said first valve assembly is in fluid communication with a first material passageway located in said manifold, and said second valve assembly is in fluid communication with a second material passageway located in said manifold,
   said hand held dispenser further comprises an elongated heater cartridge received within an access cavity in said manifold arranged in a region between, and extending essentially parallel with, said first and second material passageways, said heater cartridge configured to maintain a desired dispense material temperature,
   said drive train system includes a ball screw transmission having a screw pitch of less than 11 degrees, and
   said mixing module includes a mixing module housing with a solvent access port leading to a plurality of solvent volume expansion cavities in an interior wall surface of said mixing module housing separated by mixing module interior component retention ridges.

2. The dispenser of claim 1 wherein each of said first and second valve housings has a forward end that lies rearward of a rearward end of said mixing module.

3. The dispenser of claim 1, wherein said manifold main body portion includes a pair of manifold wing extensions positioned to opposite sides of said mixing module and each having a dispense material feed passageway section feeding to said mixing module, and each wing extension being connected, at an upstream end of said wing extensions with respect to dispense material flow, with a respective one of said first and second valve housings.

4. The dispenser of claim 3 wherein said wing extensions have forwardly converging curved side edges.

5. The dispenser of claim 3 wherein
said manifold main body portion includes a forward, central mixing module reception recess section and
wherein said wing extensions have inwardly sloping interior walls that partially define the mixing module reception recess section.

6. The dispenser of claim 1 further comprising
a mixing module fastening means that is positioned on an underside of said mixing module and pulls down the mixing module into a reception recess section in fastening the mixing module to the manifold.

7. The dispenser of claim 6 wherein said fastening means includes one or more screw fasteners that extend through the manifold and into threaded engagement with a threaded screw reception portion of said mixing module.

8. The dispenser of claim 7 wherein said fastening means includes a combination male projection portion and female side wall configuration conforming to said male projection portion in a contact region between said mixing module and manifold.

9. The dispenser of claim 1 wherein said first and second valve assemblies include valve shut off handles that are hand operatable by an operator free of tools.

10. The dispenser of claim 9 wherein said shut off valves include a rotating head with rotation limiting means and an elongated handle which extends in a common direction of elongation as that of an adjacent combination of valve housing and hose fitting.

11. The dispenser of claim 3 wherein said wing extensions have downwardly sloped upper surfaces and outer side edges that have a converging continuous exterior side edge that extends axially from a border region with an enlarged rear portion of said manifold to a front end of said dispenser.

12. The dispenser of claim 1 wherein said reciprocating member is a valve rod that reciprocates in said mixing module and said dispense material includes a first and a second type of foam precursor chemical with the first type supplied via a first hose connected to said first fitting and the second type supplied via a second hose connected to said second fitting and said first and second types being mixed within said mixing module upon retraction of said valve rod and just before exiting the dispenser outlet.

13. The dispenser of claim 1 wherein said drive train system includes a transmission housing received within a common central, axially elongated recessed section in said manifold which also receives said mixing module, and said transmission housing has a common exterior configuration as that of the mixing module housing and is in contact with a rear end of said mixing module as to provide an essentially non-stepped interface which helps avoid contaminate build up.

14. The dispenser of claim 13 wherein said driver is an electric motor and said ball screw transmission is received within said transmission housing.

15. A hand held dispenser, comprising:
a handle;
a dispense material manifold supported by said handle;
a dispense material mixing module supported at a forward, dispensing end of said manifold, said mixing module having a dispense material passageway that opens out to a dispenser outlet;
a driver supported by said handle;
a reciprocating member in driving communication with said driver and positioned for reciprocation in said mixing module;
a drive train system positioned so as to convey drive from said driver to said reciprocating member;
a first valve assembly and a first valve housing receiving said first valve assembly;
a first dispense material hose fitting in dispense material communication with said first valve housing;
a second valve assembly and a second valve housing receiving said second valve assembly; and
a second dispense material hose fitting in dispense material communication with said second valve housing; wherein
said drive train system includes a ball screw transmission,
a pitch angle of a ball screw of said ball screw transmission is less than 11 degrees, and
said mixing module includes a mixing module housing with a solvent access port leading to a plurality of solvent volume expansion cavities in an interior wall surface of said mixing module housing separated by mixing module interior component retention ridges.

16. The dispenser of claim 15 wherein
said reciprocating member is a purging or valving rod and said dispenser further comprises an electric motor with a drive shaft as said driver and said drive train system is positioned so as to convey drive from said motor to said rod, and
said drive train system includes said ball screw transmission and a gear train, with a central axis of said ball screw of said ball screw transmission being offset less than 1.5 inches from a central axis of said drive shaft.

17. The dispenser of claim 15 wherein the pitch angle is 9° or less.

18. The dispenser of claim 1 wherein the dispense material includes mixed foam precursor chemical fluid and wherein each material passageway has a main passageway section that extends along a common axis of elongation from a hose fitting inlet point to a point representing a divergence off into a chemical passageway section providing a direct feed to said mixing module which common axis is essentially parallel with an axis of elongation of said reciprocating member.

19. The dispenser of claim 1 wherein said handle includes a hollowed out upper region and a forward trigger reception opening and wherein said hollowed out region includes a trigger installation passageway that extends to said trigger reception opening.

20. The dispenser of claim 15 wherein said reciprocating member is a mixing module valving rod, said driver is an electric motor, and said drive train system is configured to transmit drive from said driver to said rod and includes a gear train set consisting of only a first and second gear in meshing contact and with said first gear being in direct engagement with a drive shaft of said motor.

21. The dispenser of claim 15 wherein said driver includes an electric motor in driving engagement with said ball screw transmission through a gear train located between a drive shaft of said electric motor and said ball screw transmission.

22. The dispenser of claim 21 wherein said gear train includes two or less gears.

23. The dispenser of claim 15 wherein said ball screw transmission is received within a transmission housing that is in contact with said mixing module and said reciprocating member is a valve or purge rod that reciprocates within said mixing module to enable mixing of foam chemical precursor material representing said dispense material.

24. The dispenser of claim 23 wherein one of said transmission housing and said mixing module has a cantilevered cowl section that covers over a reciprocating connecting end portion of said valve rod to protect from foam contamination.

25. The dispenser of claim 15 wherein said reciprocating member is a rod having an enlarged capture end and said ball screw transmission includes a puller with a capture configuration designed for receipt of said enlarged capture end.

26. The dispenser of claim 15 wherein:
said dispenser has electrical plug connection means at a rear end of said dispenser which retains an electrical feed line in position and is designed for operator pull out disassembly and push in reconnection.

27. The dispenser of claim 26 wherein said dispenser includes means for connection to respective chemical hoses at a rear end of said electrical dispenser and which are placed to opposite sides of said electrical plug connection means.

28. The dispenser of claim 26 wherein said electrical plug connection means includes a female cup-shaped connector designed to receive a male extension member.

29. The dispenser of claim 28 wherein said male extension member has a radially inward cavity with electrical leads and said female connector includes an inner projection internalizing electrical leads and said male extension member is dimensioned so as receive said inner projection as said male extension member is received by said cup-shaped female connector.

30. The dispenser of claim 29 wherein said female connector is partially received within an open hollow region at a butt end of said handle.

31. The dispenser of claim 15 wherein:
said manifold has a pair of dispense material passageways leading to said mixing module,
said first and second material hose fittings connect with respective sources of dispense material and feed dispensing material to said dispense material passageways, and
said material hose fittings are swivel fittings having a first bearing ring and a second bearing ring axially spaced from said first bearing ring.

32. The dispenser of claim 31 wherein said fittings have castellated end extensions.

33. The dispenser of claim 15 wherein:
said manifold includes a pair of dispense material passageways formed in left and right wing extensions of said manifold and leading to said mixing module; and
said dispenser further comprises elongated filter assemblies received in each of said wing extensions and extending along said passageways for more than 1.5 inches.

34. The dispenser of claim 33 wherein said filter assemblies have a filter body diameter of ⅜ inches or less and a length of more than 2.5 inches.

35. The dispenser of claim 33 further comprising shut off valves in line with said material passageways and access ports of ⅜ inch or less downstream of said valve assemblies and upstream of a filter access opening in front end of said dispenser.

36. The hand held dispenser of claim 33 further comprising an elongated heater cartridge that extends essentially parallel with said filter assemblies.

37. A hand held dispenser, comprising:
a handle;
a dispense material manifold supported by said handle;
a dispense material mixing module supported at a forward, dispensing end of said manifold, said mixing module having a dispense material passageway that opens out to a dispenser outlet;
a driver supported by said handle;
a reciprocating member in driving communication with said driver and positioned for reciprocation in said mixing module;
a first valve assembly and a first valve housing receiving said first valve assembly, and said first valve housing extending rearwardly off of a first side of a main body portion of said manifold such that said first valve housing is rearward of a rearward end of said mixing module;
a first dispense material hose fitting in dispense material communication with said first valve housing;
a second valve assembly and a second valve housing receiving said second valve assembly, and said second valve housing extending rearwardly off of a second side of the main body portion of said manifold such that said second valve housing is rearward of a rearward end of said mixing module; and
a second dispense material hose fitting in dispense material communication with said second valve housing; wherein
said first valve assembly is in fluid communication with a first material passageway located in said manifold, and said second valve assembly is in fluid communication with a second material passageway located in said manifold, and
said hand held dispenser further comprises an elongated heater cartridge received within an access cavity in said manifold extending essentially parallel with, said first and second material passageways, said heater cartridge configured to maintain a desired dispense material temperature, and
said mixing module includes a mixing module housing with a solvent access port leading to a plurality of solvent volume expansion cavities in an interior wall surface of said mixing module housing separated by mixing module interior component retention ridges.

38. A method of assembling a dispenser for use in polyurethane packaging;
including: assembling each of the components set forth, respectively, in claim 15.

39. A method of dispensing polyurethane packaging foam involving feeding foam chemical precursor dispense material of two different types to the dispenser as set forth, respectively, in claim 15 and releasing mixed dispense material from said dispenser.

40. The dispenser of claim 1, further comprising:
a temperature sensor; and
a control unit in communication with each of said heater cartridge and said temperature sensor to maintain a desired dispense material temperature of above 120° F. and within +/−2° F. of a desired setting.

41. The dispenser of claim 15, wherein
said first valve housing extends rearwardly off of a first side of a main body portion of said manifold such that said first valve housing is rearward of a rearward end of said mixing module; and
said second valve housing extends rearwardly off of a second side of the main body portion of said manifold such that said second valve housing is rearward of a rearward end of said mixing module.

* * * * *